United States Patent
Shirakami et al.

(10) Patent No.: US 10,220,662 B2
(45) Date of Patent: Mar. 5, 2019

(54) COUPLING STRUCTURE, COUPLING MEMBER HAVING COUPLING STRUCTURE, AND METHOD FOR MANUFACTURING COUPLING MEMBER HAVING COUPLING STRUCTURE

(71) Applicant: Nippon Steel & Sumitomo Metal Corporation, Tokyo (JP)

(72) Inventors: Satoshi Shirakami, Tokyo (JP); Masaaki Mizumura, Tokyo (JP); Tohru Yoshida, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 686 days.

(21) Appl. No.: 14/403,226

(22) PCT Filed: Jun. 7, 2013

(86) PCT No.: PCT/JP2013/065861
§ 371 (c)(1),
(2) Date: Nov. 24, 2014

(87) PCT Pub. No.: WO2013/183768
PCT Pub. Date: Dec. 12, 2013

(65) Prior Publication Data
US 2015/0097350 A1    Apr. 9, 2015

(30) Foreign Application Priority Data

Jun. 8, 2012  (JP) ................................. 2012-130861

(51) Int. Cl.
*B60G 7/00* (2006.01)
*B21D 22/02* (2006.01)
(Continued)

(52) U.S. Cl.
CPC ........... *B60G 7/001* (2013.01); *B21D 22/025* (2013.01); *B21D 41/026* (2013.01); *B21D 53/84* (2013.01);
(Continued)

(58) Field of Classification Search
CPC .............. B60G 7/001; B60G 2206/012; B60G 2206/811; B60G 2206/8103;
(Continued)

(56) References Cited

U.S. PATENT DOCUMENTS

| 4,621,421 A * | 11/1986 | O'Loughlin | H01R 43/16 29/874 |
| 6,263,720 B1 * | 7/2001 | Valin | B21D 53/00 29/888.092 |
| 7,793,954 B2 * | 9/2010 | Kucinski | B60G 11/16 280/124.134 |

FOREIGN PATENT DOCUMENTS

| CN | 2873547 Y | 2/2007 |
| CN | 101164801 A | 4/2008 |

(Continued)

OTHER PUBLICATIONS

Office Action dated Jan. 19, 2016 issued in related Japanese Application No. 2014120994 [with English Translation].
(Continued)

*Primary Examiner* — Paul H Dickson
*Assistant Examiner* — Joselynn Y Sliteris
(74) *Attorney, Agent, or Firm* — Birch, Stewart, Kolasch & Birch, LLP

(57) ABSTRACT

A coupling structure includes a hollow rod section formed of a metal pipe and fastening sections formed by plastic deformation of the metal pipe so as to be connected with end sections of the hollow rod section. The fastening section includes a pair of base end sections which are each con-
(Continued)

nected with a peripheral wall section forming a closed cross-section at the end section of the hollow rod section, and are separated from each other, and a bottom wall including a flat surface connected with the pair of the base end sections, and a pair of front end sections including a pair of side walls curving inwards from at least widthwise end sections of the bottom wall on a base end section side.

10 Claims, 21 Drawing Sheets

(51) Int. Cl.
    *B21D 41/02*     (2006.01)
    *B21D 53/84*     (2006.01)

(52) U.S. Cl.
    CPC .... *B60G 2206/012* (2013.01); *B60G 2206/11* (2013.01); *B60G 2206/72* (2013.01); *B60G 2206/811* (2013.01); *B60G 2206/8103* (2013.01); *B60G 2206/8104* (2013.01); *Y10T 29/49622* (2015.01)

(58) Field of Classification Search
    CPC ............ B60G 2206/72; B60G 2206/11; B60G 2206/8104; B21D 53/84; B21D 41/026; B21D 22/025; Y10T 29/49622
    See application file for complete search history.

(56) References Cited

FOREIGN PATENT DOCUMENTS

| | | |
|---|---|---|
| CN | 102177036 A | 9/2011 |
| JP | 02-033786 | 3/1990 |
| JP | 0825929 | 1/1996 |
| JP | 11-115430 | 4/1999 |
| JP | 2000344130 | 12/2000 |
| JP | 2003-103309 | 4/2003 |
| JP | 2006312773 | 11/2006 |
| JP | 2007-076547 | 3/2007 |
| JP | 2009101932 | 5/2009 |
| JP | 2010-076473 | 4/2010 |
| JP | 2010120062 | 6/2010 |
| JP | 2010-254255 | 11/2010 |
| KR | 10-2009-0039359 A | 4/2009 |

OTHER PUBLICATIONS

Office Action dated Dec. 15, 2015 issued in corresponding Chinese Application No. 201380029464.9.

International Search Report dated Aug. 13, 2013 issued in corresponding PCT Application No. PCT/JP2013/065861 [with English Translation].

"Figure including Chassis structure 1-3 editions," Apr. 5, 2004, Automobile textbook by Japan Automobile Maintenance Colleges Association, Sankaido Publishing Co., Ltd., p. 182.

Notice of Preliminary Rejection dated Dec. 20, 2017, in Korean Patent Application No. 10-2016-7023050, with English translation. Office Action dated Oct. 28, 2015 issued in corresponding Korean Patent Application No. 10-2014-7033931.

* cited by examiner

COUPLING STRUCTURE, COUPLING MEMBER HAVING COUPLING STRUCTURE, AND METHOD FOR MANUFACTURING COUPLING MEMBER HAVING COUPLING STRUCTURE

TECHNICAL FIELD OF THE INVENTION

This application is a national stage application of International Application No. PCT/JP2013/065861, filed on Jun. 7, 2013, which claims priority to Japanese Patent Application No. 2012-130861, filed on Jun. 8, 2012, each of which is incorporated by reference in its entirety.

The present invention relates to a coupling structure, a coupling member having a coupling structure, and a method for manufacturing the same.

The coupling member is preferably used as, in particular, a lateral link, a lower link, and an upper link that support a vehicle suspension, and furthermore, a coupling member for construction.

RELATED ART

It is well known that a variety of vehicle suspensions have been put into practical use in accordance with applications. For example, a five-link suspension includes both a lower link and an upper link on both the right and left sides thereof a lateral link, and a coil spring disposed on an axle or a lower link (please refer, for example, to FIG. 3 on page 182 of Non Patent Document 1).

The lower links and the upper links on the right and left sides are formed so as to receive force in the front and back direction of the axle and receive a reactive force of a torque generated in the axle during the driving and braking of a vehicle. In addition, the lateral link has one end attached to the axle and the other end attached to a vehicle body, and is formed so as to receive a lateral force.

FIG. 21 is a schematic view showing an example of a lateral link of the related art.

As shown in FIG. 21, for example, a lateral link 100 includes a rod section 110 formed of a steel pipe, a fastening section 120, and a bush press-fit section 130. The fastening section 120 couples a subject to be attached to a predetermined coupling portion by allowing a coupling member such as a bolt to be inserted into a fastening hole 121 and an attachment hole in the subject to be attached. The bush press-fit section 130 is coupled to a predetermined fastening portion by allowing a fastening member such as a bolt to be inserted into a hole in a bush press-fitted into a press-fit hole 131 and the attachment hole in the subject to he attached. The rod section 110 supports a compressive force and a tensile force exerted between the fastening section 120 and the bush press-fit section 130.

In the above-described lateral link 100 of the related art. it is usual that the rod section 110 and the fastening section 120, and the rod section 110 and the bush press-fit section 130 are connected with each other through welding. However, in the case of the connection through welding, not only does the productivity decrease, but a decrease in the strength is also concerned, and therefore it is necessary to ensure a sufficient thickness at a welding portion to reliably obtain the strength. As a result, there has been a problem of an increase in the weight of a component,

PRIOR ART DOCUMENT

Patent Document

[Patent Document 1] Japanese Unexamined Patent Application, First Publication No. 2007-07654

Non Patent Document

[Non Patent Document 1] Chassis structure 1-3 editions (Automobile textbook.) (2004 Apr. 5) by Japan Automobile Maintenance Colleges Association, published by Sankaido Publishing Co., Ltd.

DISCLOSURE OF THE INVENTION

Problems to be Solved by the Invention

As a manufacturing method for avoiding connection through welding and realizing a sufficient strength and weight reduction, there is a method in which a coupling member is shaped through hydroforming, However, there is a practical problem from the viewpoint of cost reduction and the improvement of productivity.

In addition, Patent Document 1 discloses an aluminum suspension link constituted of a hollow rod section and a binding section connected with an end portion thereof. In the above-described structure, it becomes possible to reduce the weight with a certain level of strength ensured, but there has been a case in which it becomes difficult for buckling strength against compression in an axial direction to be sufficiently exhibited. In addition, there is no description of the specific method for processing the binding section, and it has been difficult to stably shape the binding section into a complex shape. Furthermore, the material of a component is also limited only to light metals such as aluminum, and therefore it has been difficult to ensure a strength exceeding a certain level.

The present invention has been made in consideration of the above-described circumstances, and an object of the present invention is to provide a coupling structure which has an excellent buckling strength against a compressive stress in a rod axial direction, and is capable of reducing the weight and cost and improving the productivity, a coupling member having the coupling structure, and a method for manufacturing the same, Means for Solving the Problem The present invention is made for solving the above-mentioned problems and the details are as follows.

(1) According to a first aspect of the present invention, there is provided a coupling structure including a hollow rod section formed of a metal pipe; and fastening sections formed by plastic deformation of the metal pipe so as to be connected with end sections of the hollow rod section, in which the fastening section includes a pair of base end sections which are each connected with a peripheral wall section forming a closed cross-section at the end section of the hollow rod section, and are separated from each other, and a bottom wall including a flat surface connected with the pair of the base end sections, and a pair of front end sections including a pair of side walls curving inwards from at least widthwise end sections of the bottom wall on a base end section side.

(2) In the coupling structure according to the above-described (1), the fastening section may be formed by plastically deforming a pair of wall sections formed by providing two slits extending in an axial direction of the metal pipe at the end section of the metal pipe.

(3) In the coupling structure according to the above-described (1) or (2), in the pair of the base end sections, mutual separation distance on a front end section side may be greater than the mutual separation distance on a hollow rod section side.

(4) In the coupling structure according to any one of the above-described (1) to (3), a maximum width of the front end section may be greater than ½ of a length of an outer periphery in the end section of the hollow rod section.

(5) In the coupling structure according to any one of the above-described (1) to (4), the pair of the base end sections may include a first reinforcing bead protruding outwards.

(6) In the coupling structure according to any one of the above-described (1) to (4), the pair of the front end sections may include a second reinforcing bead protruding in wards.

(7) In the coupling structure according to any one of the above-described (1) to (4), the pair of the base end sections may include a first reinforcing bead protruding outwards, and the pair of the front end sections may include a second reinforcing bead protruding inwards.

(8) In the coupling structure according to any one of the above-described (1) to (7). a thick section of an uneven thickness metal pipe may he applied to the fastening section.

(9) In the coupling structure according to any one of the above-described (1) to (8). the metal pipe may be a metal pipe having a tensile strength of 590 MPa or more.

(10) In the coupling structure according to any one of the above-described (1) to (9). the metal pipe may be a steel pipe.

(11) According to a second aspect of the present invention, there is provided a coupling member including the coupling structure according to any one of the above-described (1) to (10).

(12) According to a third aspect of the present invention, there is provided a method for manufacturing a coupling member including a hollow rod section and a fastening section integrally formed with the hollow rod section, including a slit-forming process of forming a pair of wall sections by forming two slits extending in an axial direction of a steel pipe at an end section of the metal pipe; a first plastic deformation process of plastically deforming the pair of the wall sections using a press tool that relatively moves in the axial direction of the metal pipe so that the slits are separated from each other from a base end side to a front end side; and a second plastic deformation process of plastically deforming the pair of the wall sections using the press tool so that the pair of the wall sections plastically deformed through the first plastic deformation process are each connected with a peripheral wall section forming a closed cross-section at an end section of the hollow rod section, and includes a pair of base end sections separated from each other, bottom walls including a fiat surface connected with the pair of the base end sections, and a pair of front end sections including a pair of side walls curving inwards from at least width wise end sections of the bottom wall on a base end section side.

(13) In the method for manufacturing a coupling member according to the above-described (12), in the first plastic deformation process, a peripheral length of the peripheral wall section may be extended by inserting a punch into the peripheral wall section of the metal pipe forming a closed cross-section so as to expand the pipe so that the maximum width of the front end section becomes greater than ½ of a length of an outer periphery of the metal pipe on the base end section side in the hollow rod section.

(14) In the method for manufacturing a coupling member according to the above-described (12) or (13), in die second plastic deformation process, a first reinforcing bead protruding outwards may be formed in the pair of the base end sections using the press tool.

(15) In the method for manufacturing a coupling member according to the above-described (12) or (13), in the second plastic deformation process, a second reinforcing bead protruding inwards may be formed in the pair of the front end sections using the press tool.

(16) In the method for manufacturing a coupling member according to the above-described (12) or (13), in the second plastic deformation process, a first reinforcing bead protruding outwards may be formed in the pair of the base end sections using the press tool and a second reinforcing bead protruding inwards may be formed in the pair of the front end sections using the press tool.

(17) In the method for manufacturing a coupling member according to any one of the above-described (12) to (16), a thick section of an uneven thickness metal pipe may be applied to the fastening section.

(18) In the method for manufacturing a coupling member according to any one of the above-described (12) to (17), a metal pipe having a tensile strength of 590 MPa or more may be used as the metal pipe.

(19) In the method for manufacturing a coupling member according to any one of the above-described (12) to (18), a steel pipe may be used as the metal pipe.

Effects of the Invention

According to the coupling structure of the above-described (1), the fastening sections are formed by the plastic deformation of the metal pipe so as to be connected with the end sections of the hollow rod section, and thus it is not necessary to ensure a thick section for weld surfacing compared with a case in which the hollow rod section and the fastening section are connected with each other through welding.

In addition, the front end section includes the bottom wall, including the flat surface connected with the pair of the base end sections, and the pair of the side walls curving inwards from at least the widthwise end sections of the bottom wall on the base end section side, and thus the cross-section orthogonal to tire axial direction of the hollow rod section includes a portion having a channel shape. Therefore, compared with a case in which the front end section only includes the flat surface, it is possible to exhibit excellent buckling strength against the compressive stress in the axial direction.

Therefore, when the above-described coupling structure is applied to a structural member, it is possible to reduce the weight and cost of the structural member and improve the productivity of the structural member.

According to the coupling structure of the above-described (2), the fastening section is formed by plastically deforming a pair of the wall sections formed by providing two slits extending in the axial direction of the metal pipe at the end section of the metal pipe. Therefore, it is possible to easily process a fastening section having a complex shape.

According to the coupling structure of the above-described (3), in the pair of the base end sections, the separation distance on the front end section side is set to be greater than the separation distance on the hollow rod section side, and thus the degree of freedom in design improves. In addition, it is possible to more preferably obtain an effect of the channel shape that improves the buckling strength against the compressive stress in the axial direction.

According to the coupling structure of the above-described (4), the maximum width of the front end section is set to be greater than ½ of the length of the outer periphery in the end section of the hollow rod section, and thus the degree of freedom of design improves. For example, it is possible to easily press-fit or hold a bush in the front end section.

According to the coupling structure of the above-described (5), the pair of the base end sections includes the first reinforcing bead protruding outwards, and thus it is possible to improve the strength of the base end section, particularly, the buckling strength against the compressive stress in tire axial direction, and to reduce the weight.

According to the coupling structure of the above-described (6), the pair of the front end sections includes the second reinforcing bead protruding inwards, and thus it is possible to improve the strength of the front end section, particularly, the buckling strength against the compressive stress in the axial direction, and to reduce the weight.

According to the coupling structure of the above-described (7), the protrusion direction of the first reinforcing bead and the protrusion direction of the second reinforcing bead are different from each other, and thus it is possible to significantly improve the strength of the front end section, particularly, the buckling strength against the compressive stress in the axial direction, and to further reduce the weight compared with a case in which only the first reinforcing bead or the second reinforcing bead is formed.

According to the coupling structure of the above-described (8), a thick section of an uneven thickness metal pipe is applied to the fastening section formed by plastic deformation, and thus it is possible to reduce the weight by, in the coupling structure, making only a portion requiring strength thicker than other portions.

According to the coupling structure of the above-described (9), a metal pipe having a tensile strength of 590 MPa or more is used as the metal pipe, and thus it is possible to further reduce the weight of the above-described coupling structure.

According to the coupling structure of the above-described (10), a steel pipe is used as the metal pipe, and thus it is possible to further reduce the weight of the coupling structure.

According to the coupling member of the above-described (11), a reduction of the weight and cost of a member can be realized, and it is possible to improve the productivity.

According to die method for manufacturing a coupling member of the above-described (12) to (19), it is possible to reduce the weight and cost of a coupling member capable of exhibiting excellent buckling strength against, particularly, a compressive stress in the axial direction, and improve the productivity of the coupling member. In addition, it is possible to improve the degree of freedom in designing the coupling member.

EMBODIMENTS OF THE INVENTION

As a result of intensive studies regarding a coupling member including a fastening section formed in at least one end of a hollow rod section, and having force, mainly a compressive force and a tensile force, exerted on the hollow rod section for the purpose of reducing the weight and the cost and improving productivity, the present inventors found a new constitution regarding the above-described coupling member, and a manufacturing method for forming the constitution.

Hereinafter, a first embodiment of the present invention made on the basis of the above-described findings will be described with reference to FIGS. 1 to 8E.

Figure 1:
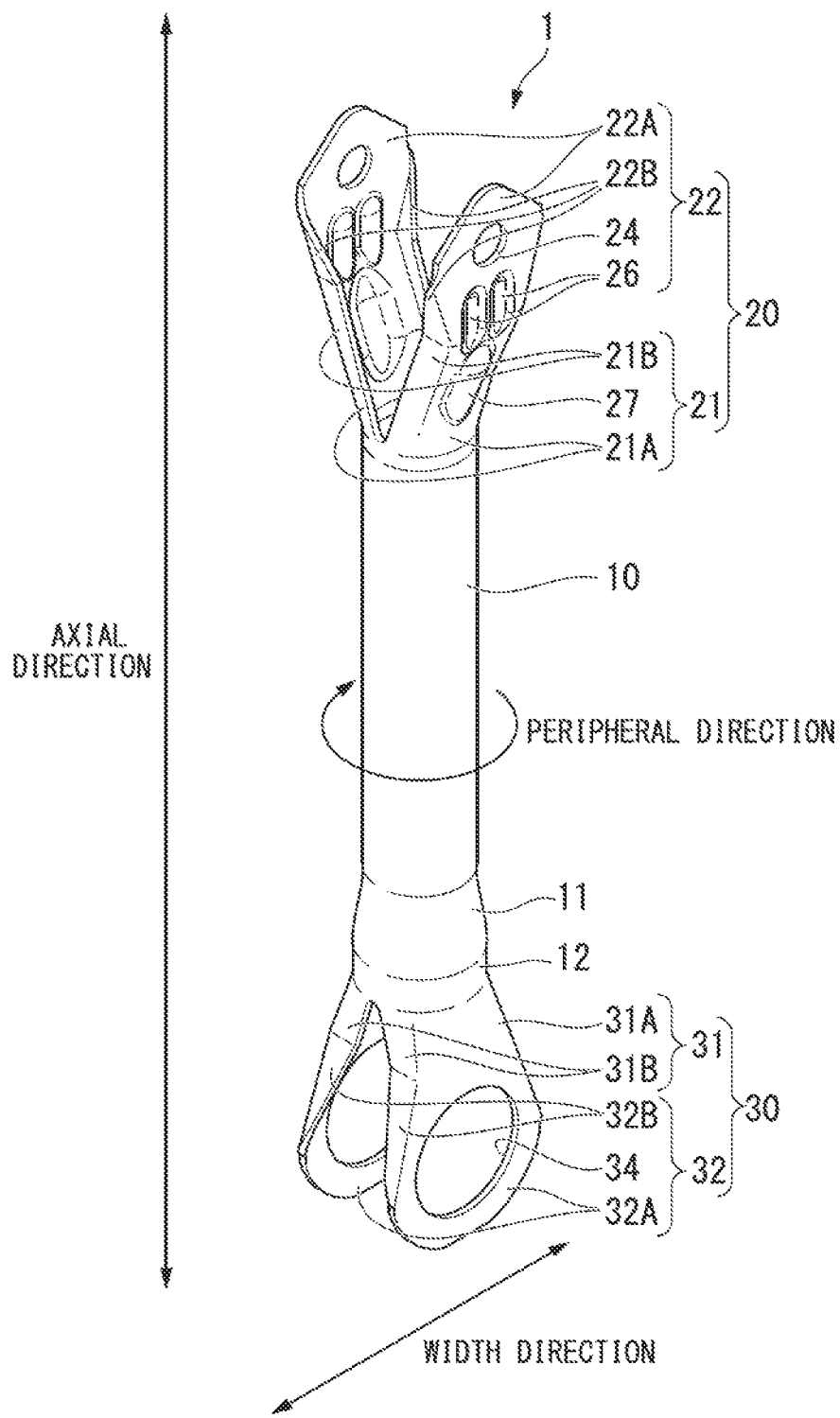
FIG. 1 is a perspective view showing an example of a lateral link 1 (coupling member) according to a first embodiment of the present invention.

FIG. 1 is a perspective view showing a schematic constitution of a lateral link 1 (coupling member) according to the first embodiment of the present invention. In the following description, as illustrated in FIG. 1, the circumferential direction of a hollow rod section is defined as the peripheral direction, the axial direction of the hollow rod section (strictly, the direction in which the hollow rod section extends from an end section of the hollow rod section) is defined as the axial direction, and the direction orthogonal to the separation direction of a pair of base end sections and the axial direction is defined as the width direction.

Figure 2:
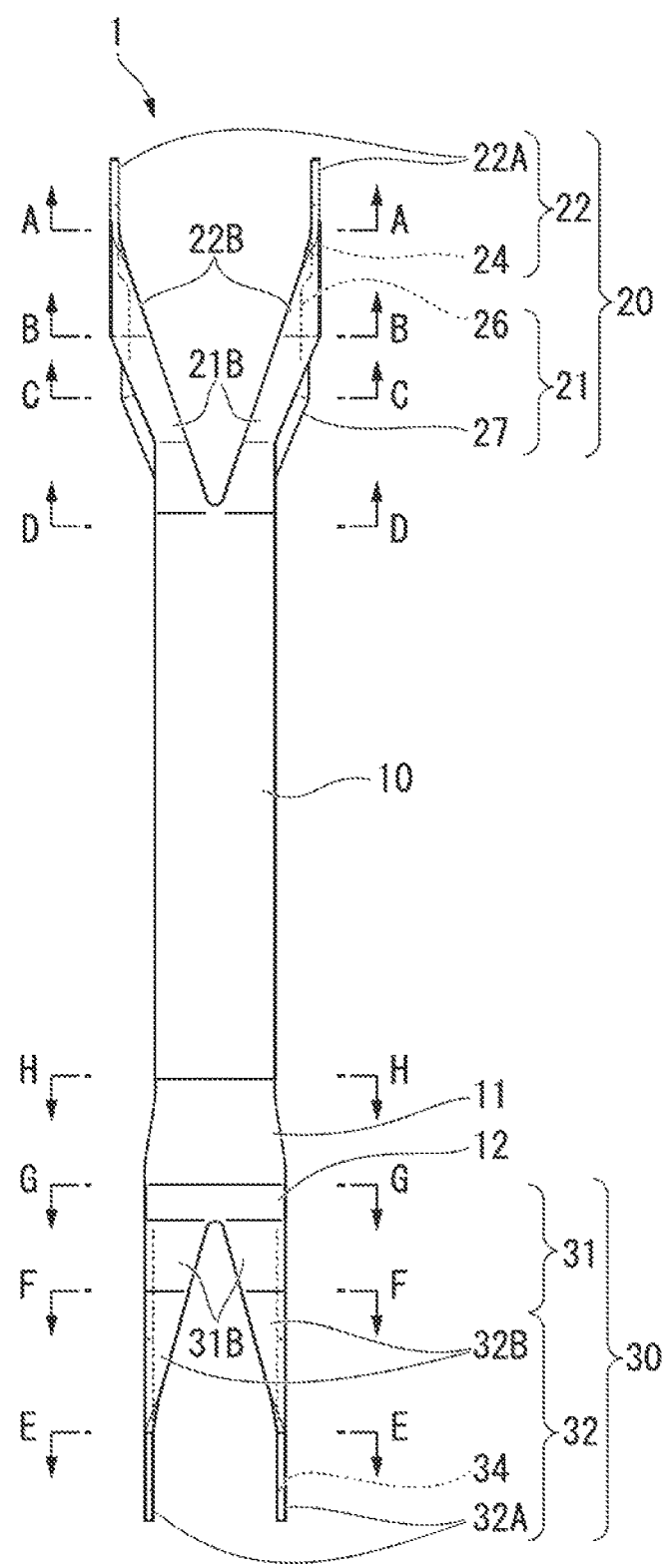
FIG. 2 is a front view showing an overview of the lateral link 1 according to the first embodiment.

FIG. 2 is a front view showing an overview of the same lateral link 1.

FIGS. 3A to 3D and FIGS. 4A to 4D are cross-sectional views of predetermined portions of a first fastening section 20 and a second fastening section 30 in the lateral link 1. In more detail, FIGS. 3A to 3D are respectively a cross-sectional view of the first fastening section 20 along the arrow A-A shown in FIG. 2, a cross-sectional sectional view along the arrow B-B, a cross-sectional view along the arrow C-C, and a cross-sectional view along the arrow D-D. FIGS. 4A to 4D are respectively a cross-sectional view of the second fastening section 30 along the arrow E-E shown in FIG. 2, a cross-sectional view along the arrow F-F, a cross-sectional view along the arrow G-G, and a cross-sectional view along the arrow H-H.

As shown in FIGS. 1 and 2, the lateral link 1 includes a hollow rod section 10, the first fastening section 20 connected with one end (the top side in FIG. 1) of the hollow rod section 10, and the second fastening section 30 connected with the other end (the bottom side in FIG. 1) of the hollow rod section 10.

For example, the first fastening section 20 is formed, so as to be capable of being coupled with a vehicle body (not shown) using a fastening member such as a bolt, and the second fastening section 30 is formed so as to be capable of being coupled with an axle through a bush (not shown).

The hollow rod section 10 is formed of a hollow steel pipe (metal pipe) having a cross-section, which is orthogonal to the axial direction of the hollow rod section, forming a closed cross-section. In addition, the first, fastening section 20 and the second fastening section 30, which are integrally formed by pressing both ends of the steel pipe, are connected with both ends of the hollow rod section 10. In this embodiment, the hollow rod section 10 includes a peripheral wall section having a round cross-section orthogonal to the axial direction, and the peripheral wall section is connected with the first tasting section 20 or the second fastening section 30.

The material of the material metal pipe is preferably metal or steel having a tensile strength of 590 MPa or more or 780 MPa or more from the viewpoint of the weight reduction.

In the present embodiment, an expanded pipe section 11 and a straight section 12, which will be described below, are formed in the end section of the hollow rod section 10 with which the second fastening section 30 is connected.

Figure 22:
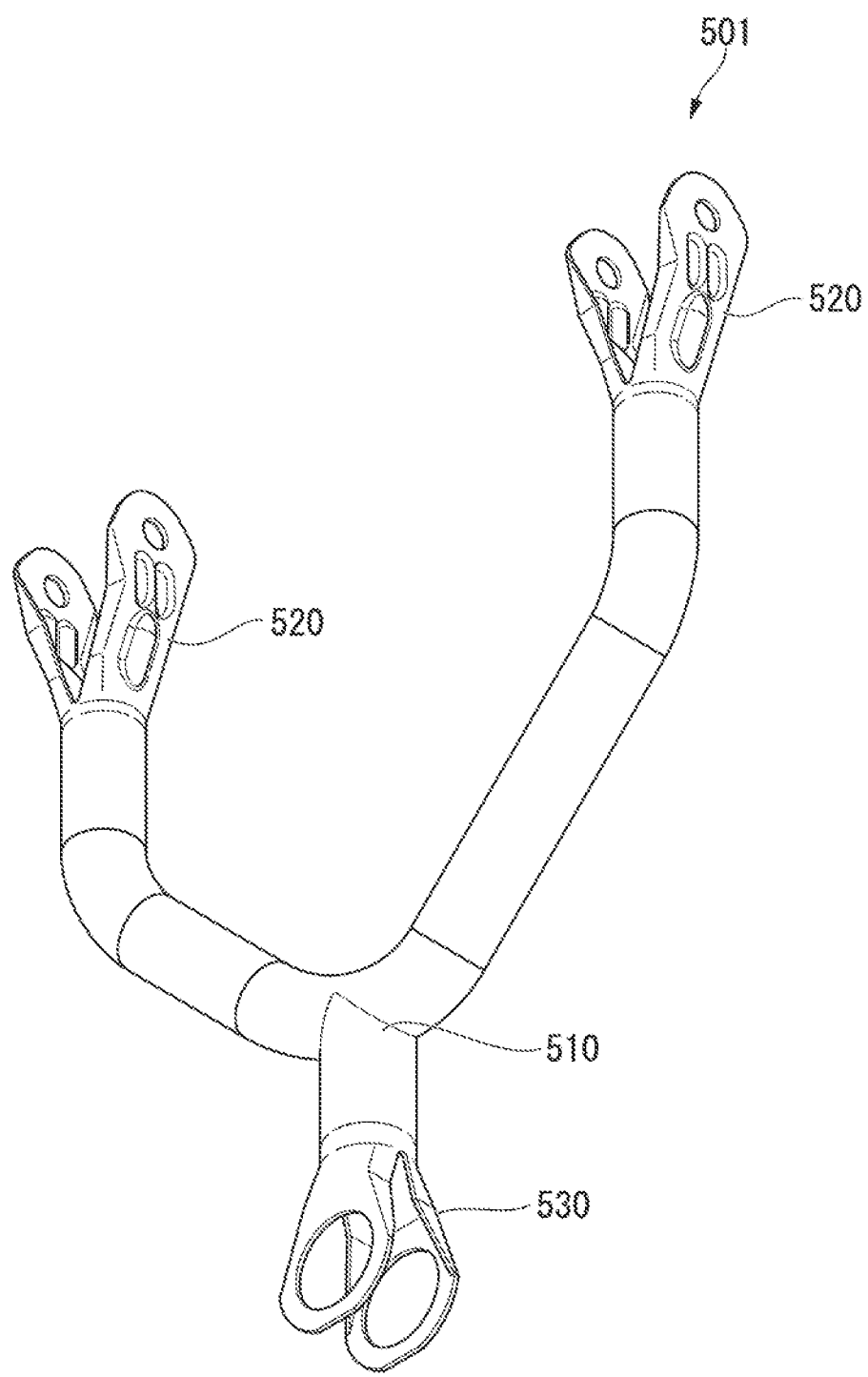
FIG. 22 is a perspective view showing a coupling member according to the first modification example of the present invention.
Figure 23:
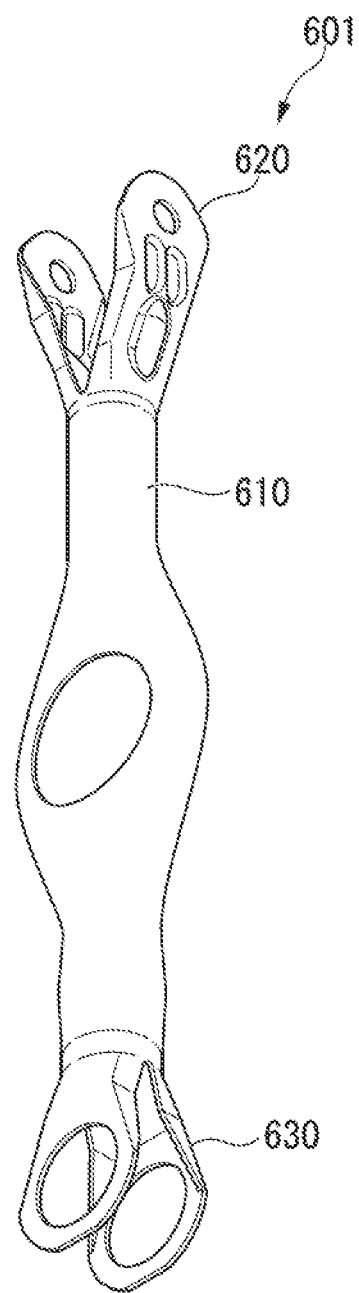
FIG. 23 is a perspective view showing a coupling member according to the second modification example of the present invention.

The hollow rod section 10 may be a hollow rod member 510 having, for example, in accordance with the form of a coupling member, a Y-like shape which is applied to a coupling member 501 according to a first modification example shown in FIG. 22. The coupling member 501. is provided with two first fastening sections 520 and 520, and one second fastening section 530. In addition, the shape of the hollow rod member 10 may be an X-like shape or a T-like shape. Furthermore, the hollow-rod section 10 may be a hollow rod member 610 having a shape in which an axial direction center section is punctured like a coupling member 601 according to a second modification example shown in FIG. 23. The coupling member 601 is provided with one first fastening section 620, and one second fastening section 630.

The first fastening section 20 is constituted of a pair of base end sections 21 and 21 which are separated from each other from an initiation point of a connection place with the hollow rod section 10 and a pair of front end sections 22 and 22 which are connected with the pair of the base end sections 21 and 21.

The pair of the base end sections 21 and 21 is constituted to be connected with the peripheral wall section at an end section of the hollow rod section 10 and are separated by a distance which gradually increases toward the front end sections 22 and 22 from an initiation point of the end section of the rod section 10. In addition, the base end section 21 has a cross-section, which is orthogonal to the axial direction, constituting a channel shape with a bottom wall 21A and side walls 21B and 21B which curve inwards from both peripheral direction ends of the bottom wall 21A and are connected with each other as shown in FIGS, 2 to 3D.

Here, the pair of the base end sections 21 and 21 are constituted to have the separation distance gradually increasing toward the front end section 22, but may have a region in which the separation distance is constant.

As illustrated in FIG. 2, the base end section 21 is formed in a front view of a V-like shape in which the separation distance gradually increases from the hollow rod section 10 toward the front end section 22.

In addition, one reinforcing bead 27 extending from inside to outside in a swelling axis direction may be formed in the widthwise center of the bottom wall 21A in the base end section 21.

The front end section 22 includes a bottom wall 22A including a flat end surface connected from the base end section 21, and a pair of side wails 22B and 22B curving inwards from widthwise end sections of the bottom wall 22 A on the base end section 21 side. Then, the front end section 22 has a cross-section, which is orthogonal to the axial direction, constituting a channel shape. In addition, the base end section 21 and the front end section 22 are connected with each other so that the channel cross-sectional shape continues in the axial direction.

According to the above-described constitution, if is possible to exhibit an excellent buckling strength against a compressive stress in the axial direction compared with a structure in which the channel cross-sectional shape is formed only in the base end section 21.

In FIG. 1, the front end section 22 has the channel cross-sectional shape formed only in a partial part in the axial direction, that is, only in a partial part on the base end section 21 side, but the channel cross-sectional shape may be formed throughout the entire part in the axial direction.

Figure 3A:
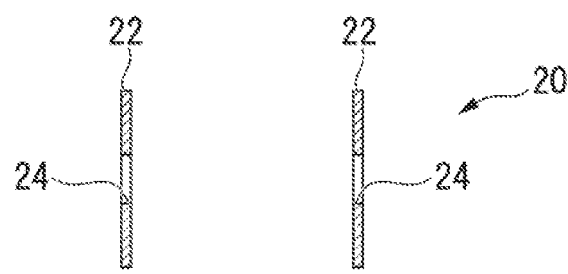
FIG. 3 A is a view showing a cross-section of a first fastening section 20 in the lateral link 1 according to the first embodiment, and is a cross-sectional view along an arrow A-A in FIG. 2.
FIG. 3B is a cross-sectional view along an arrow B-B in FIG. 2.
FIG. 3C is a cross-sectional view along an arrow C-C in FIG. 2.
FIG. 3D is a cross-sectional view along an arrow D-D in FIG. 2.

The pair of the front end sections 22 and 22 includes mutually facing flat surfaces. In the present embodiment the cross-section of the front end section 22 seen from the base end section 21 side (the hollow rod section 10 side) toward the front end section 22 side includes a flat surface throughout the entire width thereof as shown in FIG. 3A.

In addition, in the widthwise center of the front end section 22, an attachment hole 24 for allowing the insertion of a fastening member such as a bolt when the first fastening section 20 is coupled with a vehicle body is formed.

Figure 3B:
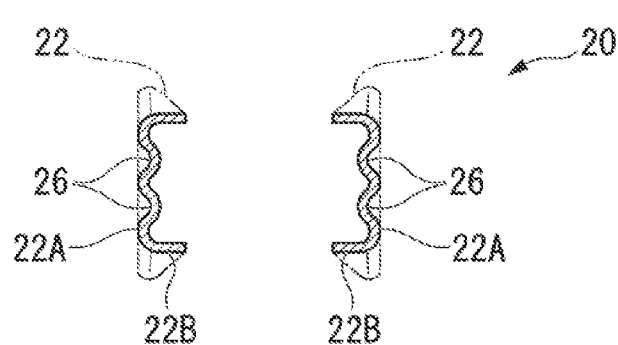
Figure 3C:
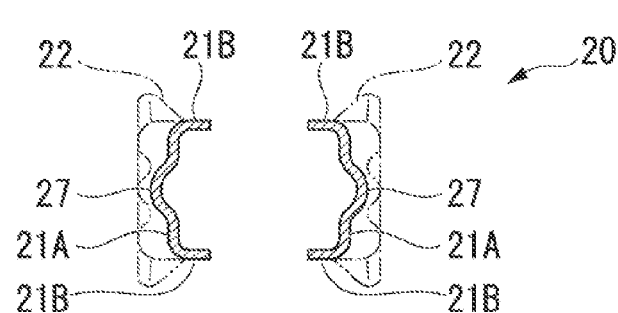

As shown in FIGS. 2 and 3B, in the front end section 22 near the connection with the base end section 21, the cross-section orthogonal to the axial direction forms a substantially channel shape. The front end section 22 is plastically deformed so that the width (peripheral direction length) of the side wall 22B in the front end section 22 decreases and the width (peripheral direction length) of the flat surface of the bottom wall 22A in the front end section 22 increases from die base end section 21 toward the front end section 22.

In addition, two reinforcing beads 26 and 26 extending from outside to inside in the swelling axis direction are formed at the widthwise center position in the bottom wall 22A of the from end section 22.

In the constitution described in the present embodiment, the reinforcing bead 27 protruding outwards is formed in the base end section 21, and the reinforcing bead 26 protruding inwards is formed in the front end section 22 as shown in FIG. 1. Therefore, no undercut becomes necessary in a processing method described below for the shape being formed, and it is also possible to significantly improve the buckling strength against the compressive load in the axial direction.

Figure 3D:
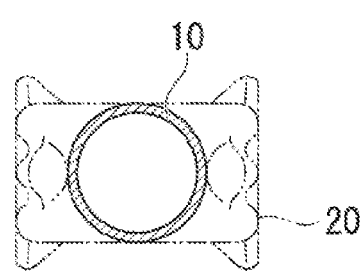

FIG. 3D shows a cross-section of the first fastening section 20 seen from the hollow rod section 10.

In addition, the length (peripheral length) of the first fastening section 20 in a cross-section orthogonal to the hollow rod section 10 is set to be the same length as the peripheral length of the peripheral wall section of the steel pipe (excluding the width of the slit formed in the manufacturing process). Meanwhile, in the present embodiment, the peripheral lengths of the pair of the wall sections constituting the first fastening section 20 are set to each be the same length.

The second fastening section 30 includes a pair of base end sections 31 and 31 which are separated from each other from an initiation point of a connection place with the straight section 12 formed at the end section of the hollow rod section 10 and a pair of front end sections 32 and 32 which are connected with the pair of the base end sections 31 and 31. The expanded pipe section 11 and the straight section 12 are formed at the end section of the hollow rod section 10 with which the second fastening section 30 is connected as shown in FIG. 1.

The expanded pipe section 11 is formed by plastically deforming the steel pipe (metal pipe) that is a material, and has a taper shape in which the diameter expands in a conic shape from the hollow rod section 10 toward the front end section 32. That is, the expanded pipe section 11 is formed so that the inner diameter on the second fastening section 30 side becomes greater than the inner diameter of the hollow rod section 10. The peripheral wall section of the expanded pipe section 11 is formed to be thinner than the metal pipe which is the material. The straight section 12 is connected with the front end side of the expanded pipe section 11.

The straight section 12 is formed to have the same diameter as an opening section of the expanded pipe section 11 on the front end side and have the same thickness as the expanded pipe section. The base end section 31 in the second fastening section 30 is connected with the front end section of the straight section 12.

The pair of the base end sections 31 and 31 is constituted to be connected with the peripheral wall section of the hollow rod section 10 at the end section of the straight section 12, and is separated from each other from an initiation point of tire end section of the straight section 12 in the hollow rod section 10. In addition, the base end section 31 constitutes a channel cross-sectional shape with a bottom wall 31A and side walls 31B and 31B connected with both peripheral direction ends of the bottom wall 31A.

In the present embodiment, the base end section 31 is formed to gradually widen from the hollow rod section 10 side toward the front end section 32 side.

Figure 4A:
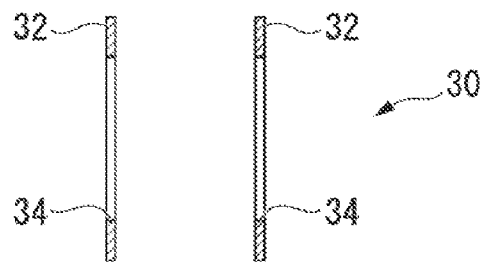
FIG. 4A is a view showing a cross-section of a second fastening section 30 in the lateral link 1 according to the first embodiment, and is a cross-sectional view along E-E in FIG. 2.
Figure 4B:
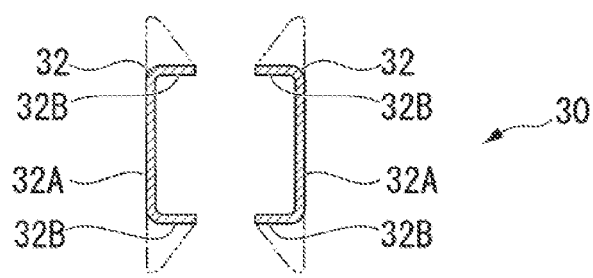
FIG. 4B is a cross-sectional view along an arrow F-F in FIG. 2.
Figure 4C:
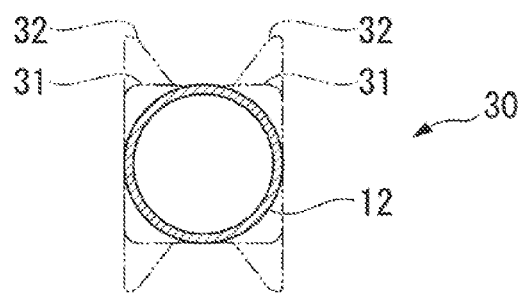
FIG. 4C is a cross-sectional, view along an arrow G-G in FIG. 2.

The front end section 32 in the second fastening section 30 includes a bottom wall 32A including mutually facing flat surfaces and side walls 32B and 32B which curve from both peripheral direction ends of the bottom wall 32 A and are connected with each other on the base end section 31 side. Therefore, the front end section 32 has a cross-section, which is orthogonal to the axial direction, having a channel shape constituted with the bottom wall 32A and the side walls 32B and 32B which are connected with both ends of the bottom wall on the bottom end section 31 side. Furthermore, the channel cross-sectional shape in the front end section 32 does not need to be formed up to the farthest section (the bottom end in FIG. 1). That is, as shown in FIGS. 2 and 4A, there may be a portion in which the side wall 32B is not formed, and the flat surface is formed throughout tire entire width.

Regarding the peripheral direction length of a front end section 32, the maximum width is preferably set to be greater than ½ of the length of an outer periphery in the end section (excluding the expanded wall section 11 and the straight section 12) of the hollow rod section 10. Then, the degree of freedom in designing a coupling member improves, and it is possible to easily press-fit or hold, for example, a bush at the front end section.

An attachment hole 34 is formed in the widthwise center of the front end section 32. When a bush is inserted into the attachment hole 34 so that a coupling member such as a bolt passes through, the bush, the second fastening section 30 and the axle are coupled with each other through the bush.

As shown in FIGS. 2 and 48, the front end section 32 includes a portion in which a cross-section orthogonal to the axial direction has a substantially channel shape. The front end section 32 is plastically deformed, so that the width (the peripheral direction length) of the side wall 32B in the front end section 32 decreases and the width (the peripheral direction length) of the flat surface of the bottom wall 32A in the front end section 32 increases from the base end section 31 toward the front end section 32.

In addition, the lengths of the base end section 31 and the front end section 32 in a cross-section orthogonal to the hollow rod section 10 are set to be the same length as the peripheral length of the peripheral wall section of the straight section 12 (excluding the width of the slit formed in the manufacturing process) which is an expanded steel pipe. Meanwhile, in the present embodiment, the pair of the wall sections constituting the second fastening section 30 are set to each have the same length (peripheral length).

Figure 4D:
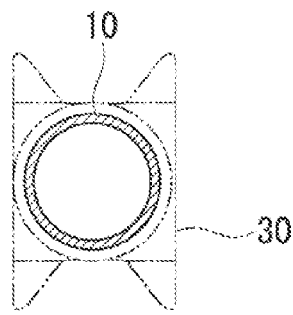
FIG. 4D is a cross-sectional view along an arrow H-H in FIG. 2.

FIG. 4D shows a cross-section of the second fastening section 30 seen from the hollow rod section 10.

Next, a method for forming the first fastening section 20 will be described with reference to FIGS. 5 and 6A to 6D.

Figure 5:
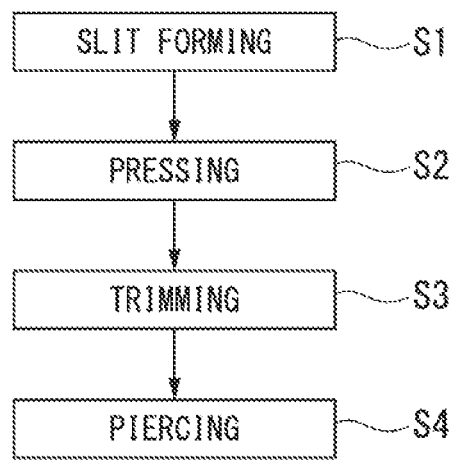
FIG. 5 is a block diagram showing a step for forming the first fastening section 20 in the lateral link 1 according to the first embodiment.

FIG. 5 is a block diagram showing an example of a method for forming the first fastening section 20 by plastically deforming the first fastening section 20 by pressing a steel pipe 10M in the step for manufacturing the lateral link 1.

FIGS. 6 A to 6D are views explaining a slit-forming step (Step S1) and a pressing step (Step S2) in FIG. 5. FIG. 6A is a view showing the steel pipe KM in a state in which slits are formed. FIGS. 6B, 6C, and 6D are views showing the states of the lateral link 1 and a press tool during the pressing. Meanwhile, the press tool holds the steel pipe 10M of a disposed material includes a die D1 including a forming section corresponding to the external form of the first fastening section 20 and a punch P1, and has a constitution allowing the punch P1 to advance through the steel pipe 10 M set in the die D1 in the axial direction of the steel pipe.

In addition, the die Dl and the punch P1 have shaped corresponding to the reinforcing heads 26 and 27 formed therein, thereby enabling the reinforcing bead 26 protruding inwards and the reinforcing bead 27 protruding outwards to be formed in the first fastening section 20. Therefore, no undercut is generated during pressing. In addition, in a case in which the first fastening sections 20 and 20 are formed on both end sections of the hollow rod section SO, the die can be divided in, for example, the axial direction of the steel pipe 10M so that a product can be ejected from the die after the first fastening section is formed.

The first fastening section 20 is formed in, for example, the order shown in FIG. 5.

(1) First, two slits 20S and 20S extending in the axial direction of the steel pipe are formed at the end sections of the steel pipe 10M constituting the hollow rod section 10. thereby providing a pair of wall sections 20A and 20A having the same peripheral direction length (Step S1).

Figure 6A:
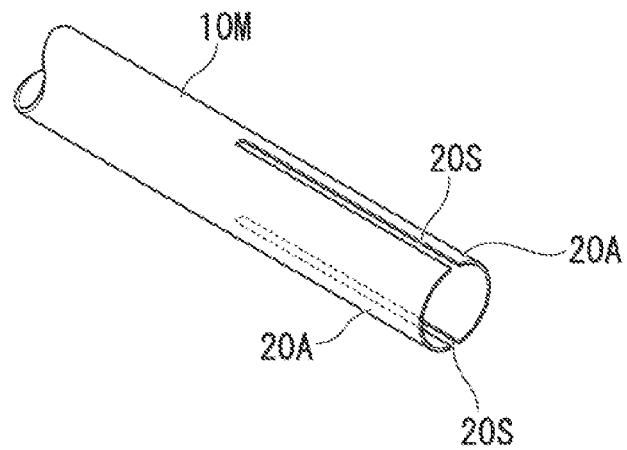
FIG. 6A is a perspective view explaining a step for manufacturing the lateral link 1 according to the first embodiment, and is a perspective view showing a state in which slits are formed in a steel pipe when the first fastening section 20 is formed.

In the present embodiment, a pair of facing wall sections 20A and 20A having the same shape is formed by, for example, forming two slits 20S and 20S at peripheral direction positions which are symmetrical to each other with respect to the central axis of the steel pipe 10M as shown in FIG. 6A.

(2) Next, the steel pipe 10M is pressed, thereby plastically deforming the pair of the lacing wall sections 20A into the first fastening section 20 (Step S2).

Figure 6B:
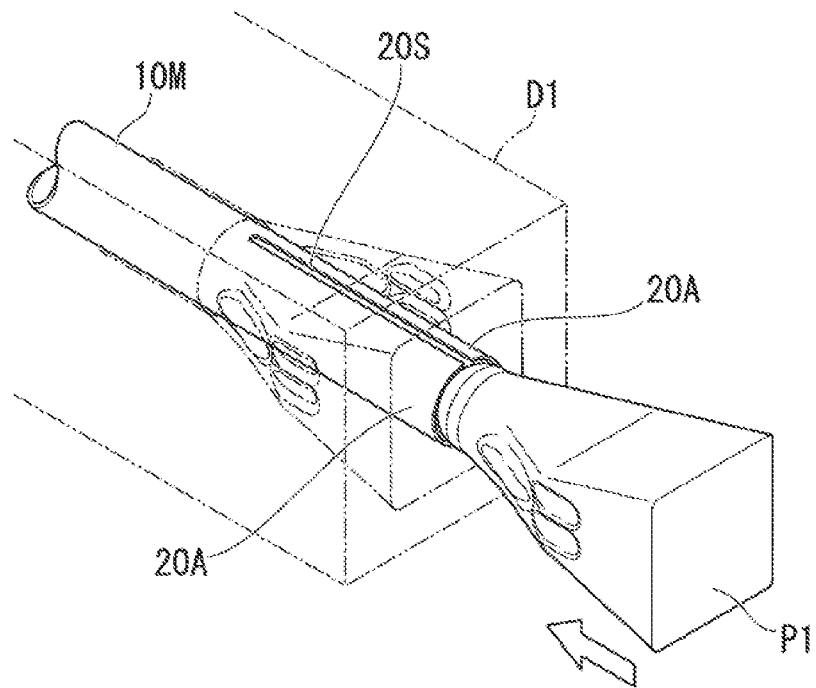
FIG. 6B is a perspective view showing a state in which the slit-formed steel pipe is set in a press tool when the first fastening section 20 is formed.
Figure 6C:
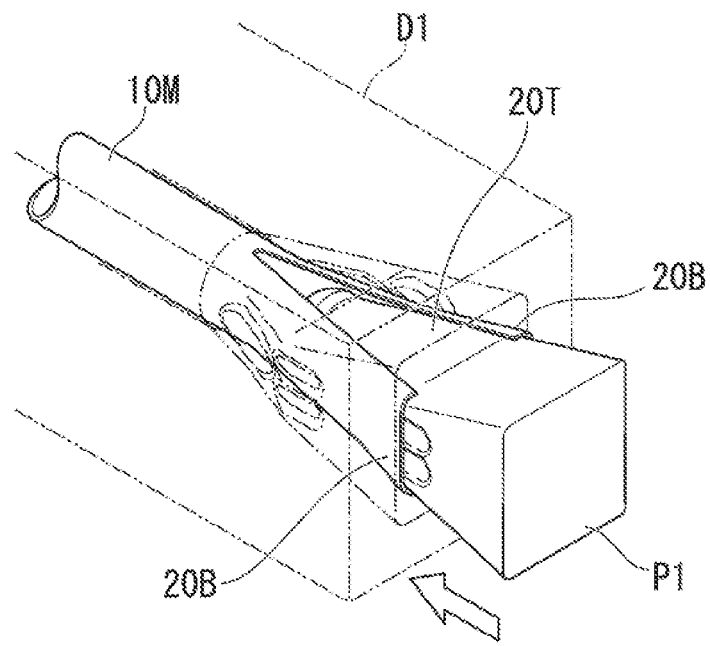
FIG. 6C is a perspective view showing a state in which a punch advances through the slit-formed steel pipe that has been inserted into a die when the first fastening section 20 is formed.
Figure 6D:
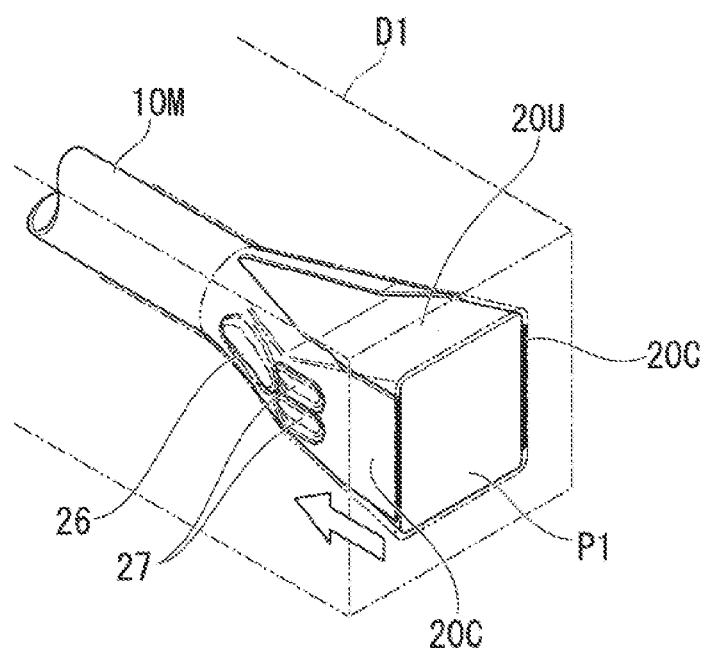
FIG. 6D is a perspective view showing a state in which the punch advances up to an advancement end, and the first fastening section 20 is formed by plastic deformation.

The steel pipe is pressed in, for example, the order as shown in FIGS. 6B to 6D.

(2-1) First, as shown in FIG. 6B, the steel pipe 10M is set in a press tool, and the punch P1 is advanced in the axial line direction of the steel pipe 10M, thereby inserting the punch between the wall sections 20A.

(2-2) Next, the punch 1 is advanced, thereby forming the slits 20S into V-shaped slits 20T, and plastically deforming the wall sections 20A into wall sections 20B having front ends separated from each other as shown in FIG. 6C.

(2-3) Next, as shown in FIG. 6D, the punch P1 is advanced up to an advancement end, thereby forming the slits 20T into slits 20U, and forming the wall sections 20B into wall sections 20C, which correspond to the first fastening section 20, having front ends separated from each other with a wider gap than the steel pipe 10M therebetween.

(3) Next, the wall sections 20C are trimmed using a trimming press or the like, thereby removing excessive parts (Step S3).

(4) Next, the attachment hole 24 is pierced in the wall section obtaining the external form of the first fastening section 20 through trimming using a drill or the like (Step S4).

Figure 7:
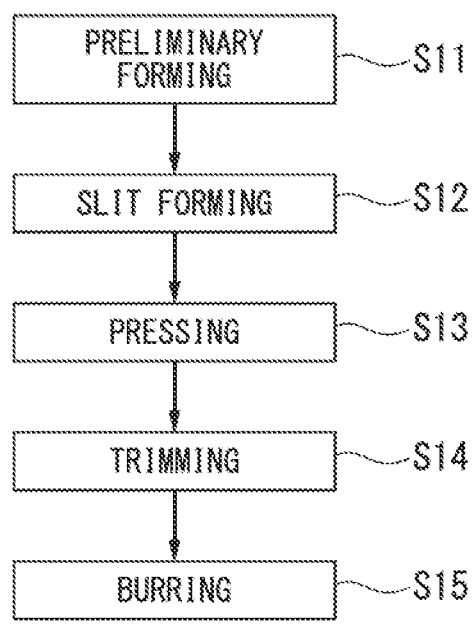
FIG. 7 is a block diagram showing a step for forming the second fastening section 30 in the lateral link 1 according to the first embodiment.

FIG. 7 is a block diagram showing an example of a method for forming the second fastening section 30 through plastic deformation by pressing the steel pipe 10M in the step for manufacturing the lateral link 1.

Figure 8A:
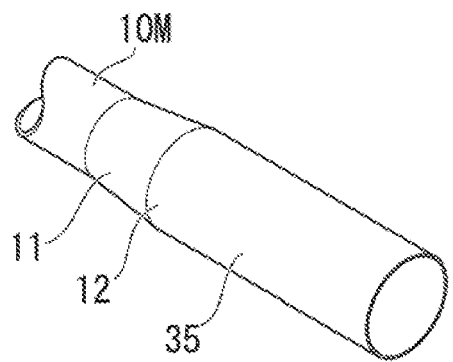
FIG. 8A is a view explaining the step for manufacturing the lateral, link 1 according to the first embodiment, and is a perspective view showing a state in which a peripheral wall section of the steel pipe is expanded by preliminary forming when the second fastening section 30 is formed.
Figure 8B:
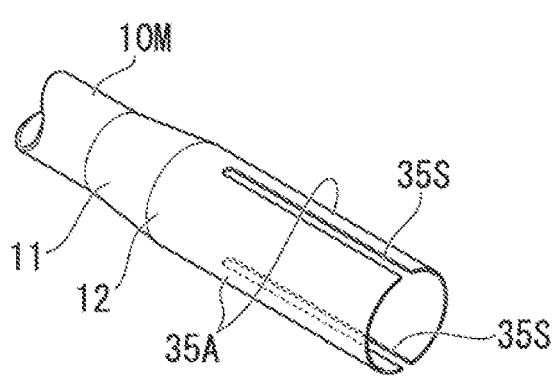
FIG. 8B is a perspective view showing a state in which slits are formed in the preliminarily-formed steel pipe when the second fastening section 30 is formed.
Figure 8C:
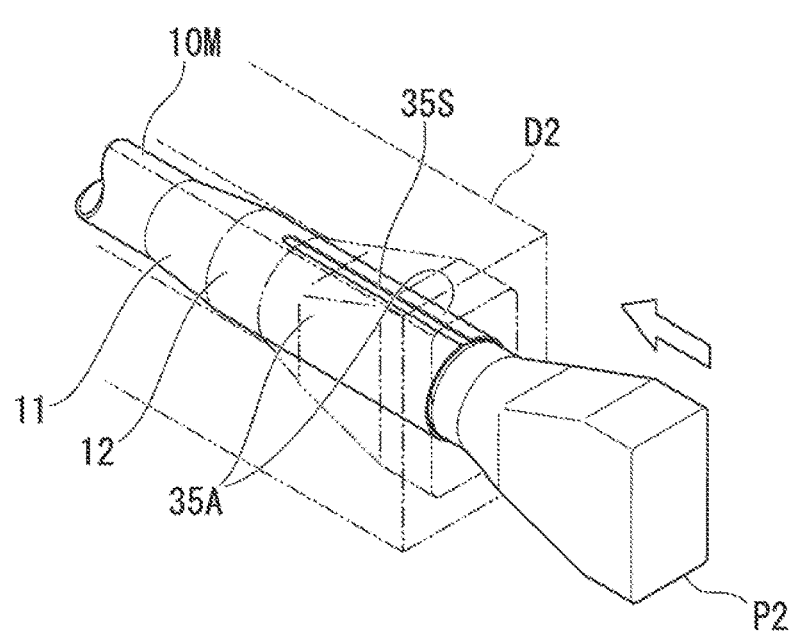
FIG. 8C is a perspective view showing a state in which the preliminarily-formed slit-formed steel pipe is set in the press tool when the second fastening section 30 is formed.
Figure 8D:
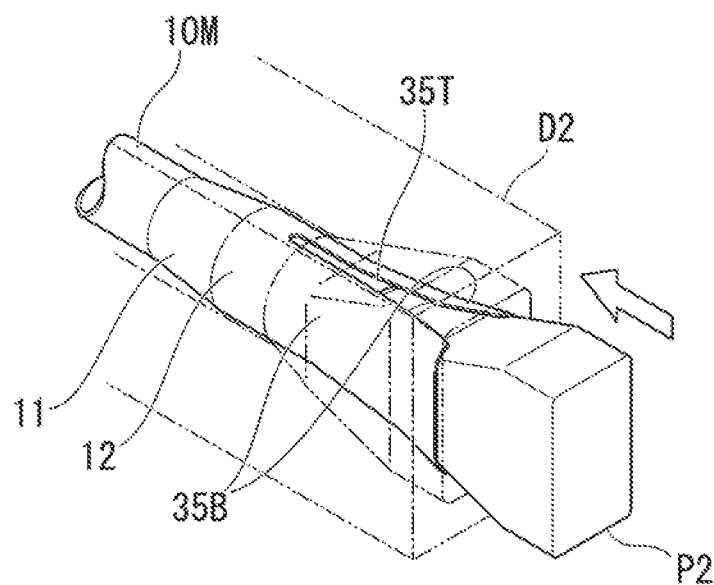
FIG. 8D is a perspective view showing a state in which the punch advances through tire slit-formed steel pipe that has been inserted into the die when the second fastening section 30 is formed.
Figure 8E:
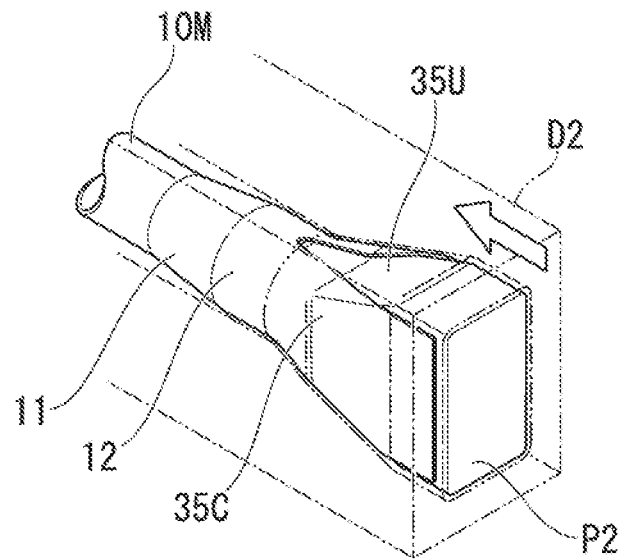
FIG. 8E is a perspective view showing a state in which the punch advances up to an advancement end, and the second fastening section 30 is formed by plastic deformation.

FIGS. 8A to 8E are views showing a preliminary forming step (Step S11), a slit-forming step (Step S12), and a pressing step (Step S13) in FIG. 7. FIG. 8A is a view showing the preliminarily-formed steel pipe 10M, FIG. 8B is a view showing the steel pipe IOM in a state in which slits are formed, and FIGS. 8C, 8D, and 8E are views showing the slates of the lateral link 1 and a press tool during the pressing. Meanwhile, the press tool holds the steel pipe 10M of a disposed material, includes a die D2 including a forming section corresponding to the external form of the second fastening section 30 and a punch P2, and has a constitution allowing the punch P2 to advance toward the straight section 12 in the steel pipe 10 M set in the die D2 in the axial direction of the steel pipe 10M.

The second fastening section 30 is formed in, for example, the order shown in FIG. 7.

(1) First, the expanded pipe section 11 and the straight section 12 are formed by inserting, for example, a punch (not shown) into the steel pipe 10M constituting the hollow rod section 10 (Step S11).

The steel pipe 10M in which the expanded pipe section 11 and the straight section 12 have been formed includes a taper in which the diameter of the expanded, pipe section 11 expands in a conic shape from the base end side toward the front end side as shown in FIG. 8A. The steel pipe is opened so that the diameter of the expanded pipe section 11 on the front end side becomes greater than the diameter of the steel pipe 10M. The straight section 12 and a section to be formed 35 having the same cross-section as the straight section 12 are connected with the expanded pipe section 11 on the front end side. The section to he formed 35 refers to a section to be formed into die base end section 31 and the front end section 32 through pressing. The expanded pipe section II, the straight section 12, and the section to he formed 35 are formed to be thinner than the steel pipe 10M.

(2) Next, two slits 35S and 35S extending in the axial direction are formed in the steel pipe 10M, thereby providing a pair of wall sections 35A and 35A having the same peripheral direction length and thus forming wall sections corresponding to the second fastening section 30 (Step S12).

In the present embodiment a pair of facing wall sections 35A and 35A having the same shape is formed by, for example, forming two slits 35S and 35S at peripheral direction positions which are symmetrical to each other with respect to the central axis of the section to be formed 35 as shown in FIG. SB.

(3) Next, the steel pipe 10M (the section to be formed 35) is pressed, thereby plastically deforming the pair of the lacing wall sections 35A and 35 A into the second fastening section 30 (Step S13).

The steel pipe is pressed in for example, the order as shown in FIGS. 8C to 8E.

(3-1) First, as shown in FIG. 8C the steel pipe 10M is set in a press tool, and the punch P2 is advanced in the axial line direction of the steel pipe 10M, thereby inserting the punch between the wall sections 35A and 35A.

(3-2) Next, the punch P2 is advanced, thereby forming the slits 35S into substantially Y-shaped slits 35T, and plastically deforming the wall sections 35A into wall sections 35B in which, side walls are formed at both widthwise ends, die widths of the side walls decrease as the side walls go toward the front end, and thus the side walls change the shape into a flat surface, thereby forming a middle shape of the second fastening section 30.

(3-3) Next, as shown in FIG. 8E the punch P2 is advanced up to an advancement end, thereby forming the slits 35T into slits 35U, and forming the wall sections 358 into wall sections 35C, thereby forming wall sections, which correspond to the second fastening section 30, having front ends separated from each other with the substantially same gap as the exterior form of the steel pipe 10M therebetween.

(4) Next, the wall sections 35C are trimmed using a trimming press or the like, thereby removing excessive parts (Step S14).

(5) Next, the attachment hole 34 is burred in the wall section obtaining the external form of the second fastening section 30 through trimming using a burring press or the like (Step S. The attachment hole 34 formed through burring includes a standing wall section formed at the edge section of the hole, and thus it is possible to press-fit aid hold a bush or the like.

According to the lateral link 1 of the first embodiment the first fastening section 20 and the second fastening section 30 are formed by plastically deforming the pair of the wall sections 20A and 20A or 35A and 35A which are formed by providing two slits in the steel pipe 10M constituting the hollow rod section 10. Therefore, it is possible to easily produce the lateral link 1 including the fastening sections with a complex shape, and it becomes possible to process a material having poor processability into the fastening section having a complex shape, and thus a high-strength metal pipe that could not be used in a manufacturing method of the related art from the viewpoint of processability, for example, a steel pipe of 590 MPa or more or 780 MPa or more, can be used. Furthermore, it is not necessary to ensure a thick section for weld surfacing. Therefore, it is possible to reduce the weight of the lateral link 1 and improve productivity. As a result, it is possible to reduce the cost of the lateral link 1.

In addition, according to the lateral link 1 of the first embodiment, the base end sections 21 in the first fastening section 20 are constituted to have the mutual separation distance increasing toward the front end side, and therefore it is possible to set the separation gap between the front end sections 22 to be greater than the hollow rod section 10.

According to the lateral link 1 of the first embodiment, the base end sections in the second fastening section 30 are constituted to have a width extending toward the front end side, and therefore it is possible to form the flat surface in the front end section 31 to be greater than the hollow rod section 10. As a result, it is possible to easily press-fit or hold a bush in the front end section 31.

In addition, according to the lateral link 1 of the first embodiment, the first listening section 20 is formed by plastically deforming the side walls 20A, which are provided by forming the slits 20S in the steel pipe 10M, through pressing using the die Dl and the punch PI. Therefore, it is possible to form the first fastening section 20 in a uniform thickness by controlling the thickness reduction during the pressing.

In addition, the second fastening section 30 is formed by plastically deforming the side walls 35S, which are provided by forming the slits 35S in the expanded section to be formed 35, through pressing using the die D2 and the punch P2. Therefore, it is possible to form the second fastening section 30 in a uniform thickness by controlling the thickness reduction during the pressing.

As described above, a desired thickness is ensured by controlling the thickness reduction when the first fastening section 20 and the second fastening section 30 are plastically deformed, and therefore it is possible to improve the reliability in strength calculation.

According to the lateral link 1 of the first embodiment, the first fastening section 20 includes the reinforcing beads 26 and 27, and therefore it is possible to improve the strength of the curved portion in the base end section. In addition, it is possible to reduce the weight and cost, and improve the productivity by plastically deforming the reinforcing beads 26 and 27 through pressing.

According to the method for manufacturing the lateral link 1 of the first embodiment, the pair of the wall sections 20A and 35A extending in the axial direction is formed by providing two slits 20S and 35S extending in the axial direction in the peripheral wall section, which forms a closed cross-section, in the steel pipe 10M, and the pair of tire wall sections 20A and 35A is pressed, and therefore it is possible to efficiently form the first fastening section 20 and the second fastening section 30.

In addition, according to the method for manufacturing the lateral link 1 of the first embodiment, the peripheral length of the peripheral wall section is extended by inserting the punch into the peripheral wall section, which forms a closed cross-section, in the steel pipe 10M, and thus expanding the steel pipe, and therefore it is possible to form the second fastening section 30 having a Oat surface wider than the peripheral wall section in the hollow rod section 10 on the front end side.

Therefore, it is possible to easily and efficiently form the second fastening section 30 having a fiat surface wider than the peripheral length of the peripheral wail section in the hollow rod section 10, and improve productivity.

Next, a second embodiment of the present invention will be described with reference to FIGS. 9 to 14.

In the following description, an uneven thickness steel pipe refers to a steel pipe including a thick section at a portion corresponding to at least a part of the front end section having a flat surface formed through plastic deformation, and the thick section and other sections can be connected in an arbitrarily-set manner such as multiple levels, a taper, or a smooth curve.

In addition, regarding the thickness of the thick section, a thick section having a uniform thickness and a thick section having a step-like or smoothly-changing thickness are also considered as the thick section, and in a ease in which the thick sections are formed at both ends of the uneven thickness steel pipe, the thick sections on both ends may have different thicknesses.

In the present specification, the thick section of the uneven thickness steel pipe may be applied to the front end section having a flat surface formed through plastic deformation by, for example, forming the thick section of the uneven thickness steel pipe at the entire base end section as well as the entire front end section or at a part of the base end section as well as the entire front end section, or forming the thick section only at the front end section or at a part of the front end section. In addition, the thick section of the uneven thickness steel pipe may be formed on sections other than the front end section.

In a case in which the front end sections are formed at both ends of the uneven thickness steel pipe, the thick section of the uneven thickness steel pipe may be formed only one end, and a variety of the above-described aspects may be distinctively used at both front end sections.

Figure 9:
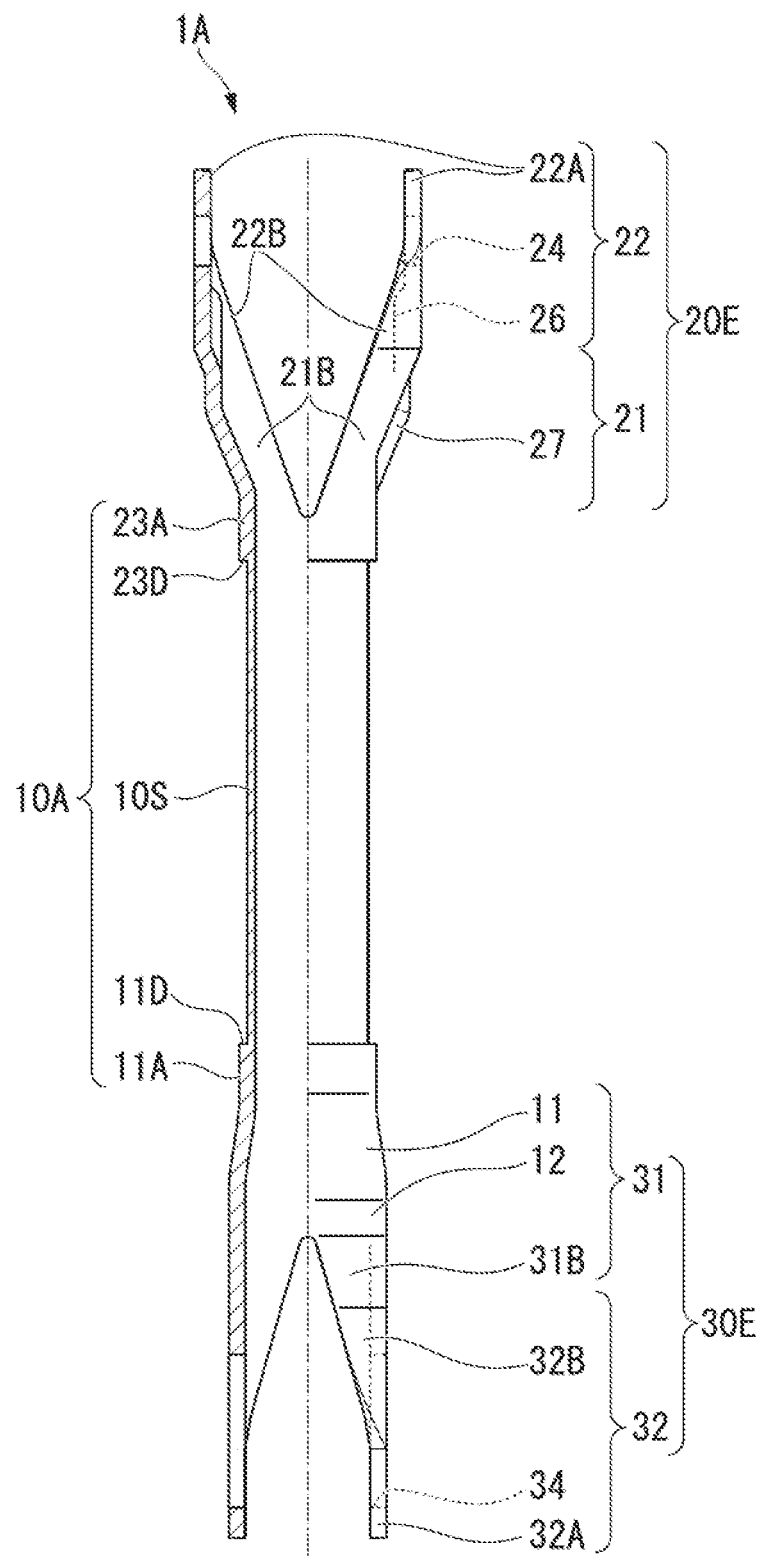
FIG. 9 is a partial cross-sectional view seen from the front explaining an overview of a lateral link 1A according to a second embodiment of the present invention.
Figure 10:
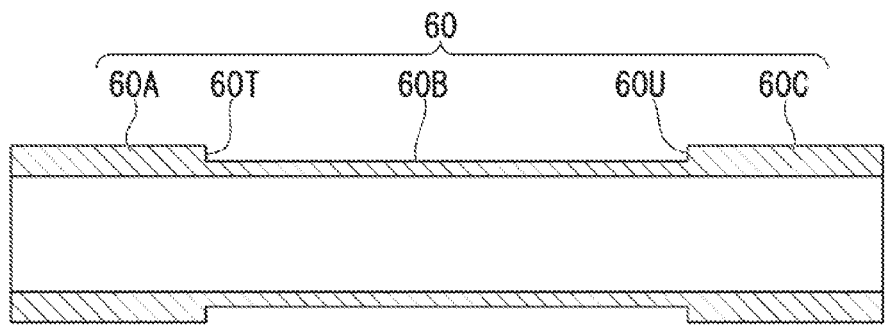
FIG. 10 is a cross-sectional view explaining a schematic constitution of a multilevel uneven thickness steel pipe used for manufacturing the lateral link 1A according to the second embodiment.

FIG. 9 is a partial cross-sectional view of a lateral Sink (coupling member) 1A according to the second embodiment seen from the front, and FIG. 10 is a cross-sectional view showing a schematic constitution of a multilevel uneven thickness steel pipe 60 used for manufacturing the lateral link 1A.

The difference of the second embodiment from the first embodiment is that the lateral link 1A including a first fastening section 20E and a second fastening section 30E, to which the use of the multilevel steel pipe (metal pipe) 60 provides a relatively thicker thickness than a hollow rod section 10A, are manufactured, and the other aspects are the same as in the first embodiment, and thus a description thereof will be omitted here by using the same reference numbers.

The lateral link 1A includes the hollow rod section 10A, a first fastening section 20E connected with one end of the hollow rod section 10A, and a second listening section 30E connected with the other end of the hollow rod section 10A as described in FIG. 9. The lateral link 1A is formed by plastically deforming both ends of the multilevel steel pipe 60 through pressing.

In addition, in the lateral link 1A, the first fastening section 20E and the second fastening section 30E are integrally formed with the hollow rod section 10A, and the first fastening section 20E and the second fastening section 30E are formed to be relatively thicker than a straight section 10S in the hollow rod section 10A.

As shown in FIG. 10, the multilevel uneven thickness steel pipe 60 used for manufacturing the lateral link 1A includes, for example, a first thick section 60A, a thin section 60B, and a second thick section 60C, the first thick section 60A is connected with tire thin section 60B through a multilevel section 60T protruding outwards in the radial direction from the thin section 60B, and the second thick section 60C is connected with the thin section 60B through a multilevel section 60U protruding outwards in the radial direction.

In the present embodiment, for example, the first thick section 60A and the second thick section 60C have the same thickness.

The hollow rod section 10A includes, for example, the straight section 10S formed in a cylindrical shape, a fastening section-side multilevel section 23D and a fastening section-side thick section 23A, which are formed on the first fastening section 20E side of the straight section 10S, and a holding section-side multilevel section 11D and a holding section-side thick section 11A, which are formed on the second fastening section 30E side.

The fastening section-side thick section 23A is formed in substantially the same thickness as the first fastening section 20E, and is connected with the straight section 10S through the fastening section-side multilevel section 23D protruding outwards from the straight section 10S which is formed to be relatively thin.

The holding section-side thick section 11A is connected with the straight section 10S through the holding section-side multilevel section 11D protruding outwards from the straight section 10S which is formed to be relatively thin, and is formed to be thicker than the straight section 10S.

The second fastening section 30E is expanded on the front end side from the expanded tube section 11 through plastic deformation, and is opened to be greater than the internal diameter of the hollow rod section 10A toward the front end side from the base end side. Therefore, similar to the first embodiment, the peripheral wall section is formed to be thinner than the holding section-side thick section 11A.

Whether the second fastening section 30E is set to be thicker than the straight section 10S can be arbitrarily set depending on the thickness of the thick section in the multilevel uneven thickness steel pipe 60.

Figure 11:
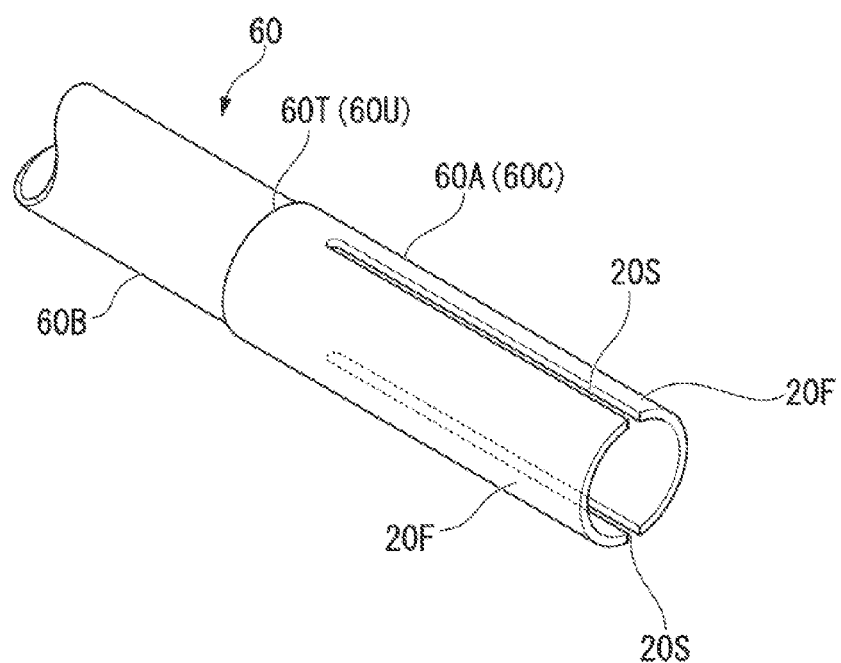
FIG. 11 is a perspective view showing a state in which slits are formed in the steel pipe when a front end section is formed in the step for manufacturing the lateral link 1A according to the second embodiment.
Figure 12:
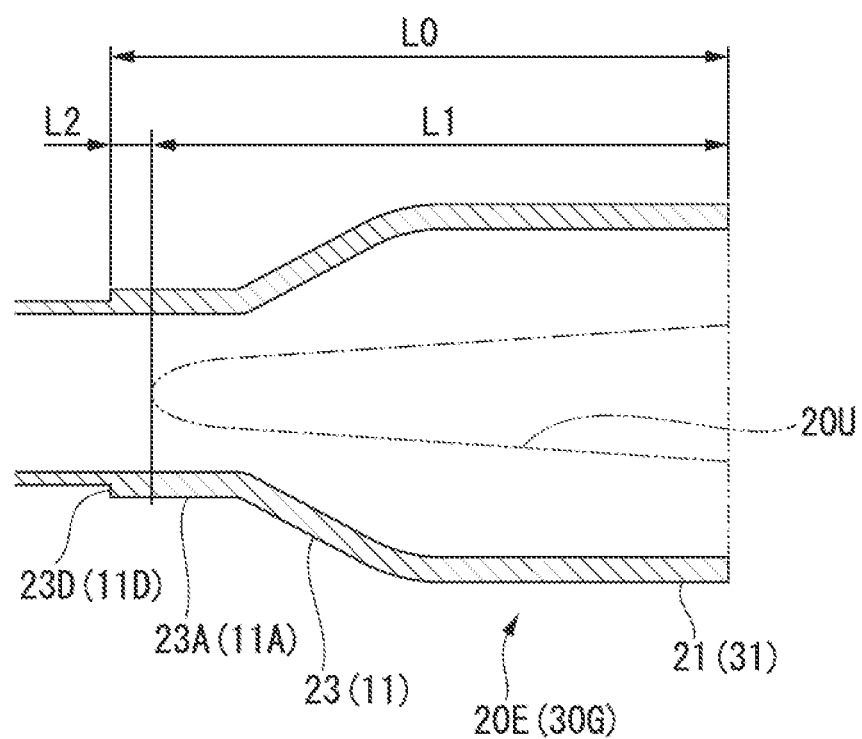
FIG. 12 is a cross-sectional view showing a state in which a fastening section is formed in the lateral link 1A according to the second embodiment by forming a pair of facing wall sections in the front end section.

FIG. 11 is a perspective view showing a state in which a pair of facing wall sections 20F and 20F is formed by forming two slits 20S and 20S in the multilevel uneven thickness steel pipe 60 when the first fastening section 20E is formed in the step for manufacturing the lateral link 10A. FIG. 12 is a cross-sectional view showing a state in which the first fastening section 20E is formed in the step for manufacturing the lateral link 10A.

When the slits 20S are formed, for example, within the range of the thick sections 60A and 60C in the multilevel uneven thickness steel pipe 60 as shown in FIG. 11, the strength of the first fastening section 20E is easily and stably ensured, and the quality is easily managed, which are preferable. The slits 20S can be formed up to a straight section 60B in the multilevel uneven thickness steel pipe 60. What has been described above shall similarly apply to the second fastening section 30E.

FIG. 12 is also a cross-sectional view showing the lateral link 10A in a state in which the first fastening section 20E is formed by forming a pair of the facing wall sections 20F and 20F in the front end section 22. In FIG. 12, the reference sign L0 indicates the length from the front end section of the front end section 22 to the fastening section-side multilevel section 23D, the reference sign L1 indicates the length from the front end of the front end section 22 to a strain-affected end section, and the reference sign L2 indicates the length from the strain-affected end section to the fastening section-side multilevel section 23D.

Here, it is preferable to satisfy L2>0 since the strength of the first fastening section 20E is stably ensured. Furthermore, the stain-affected end section refers to a portion corresponding to the depth location of the slit 20U formed by widening the slit 20S shown in FIG. 6B. What has been described above shall similarly apply to the second fastening section 30E.

According to the lateral link 1A of the second embodiment, the thick sections 60A and 60C in the multilevel uneven thickness steel pipe 60 are applied to the first fastening section 20E and the second fastening section 30E formed through plastic deformation. Therefore, the first fastening section 20E and the second fastening section 30E, in which a greater strength is required, are formed to be thicker than the hollow rod section 10A, in which a relatively lower strength is required, and consequently, it is possible to efficiently reduce the weight of the lateral link 1A, and furthermore, reduce the manufacturing cost.

Figure 13:
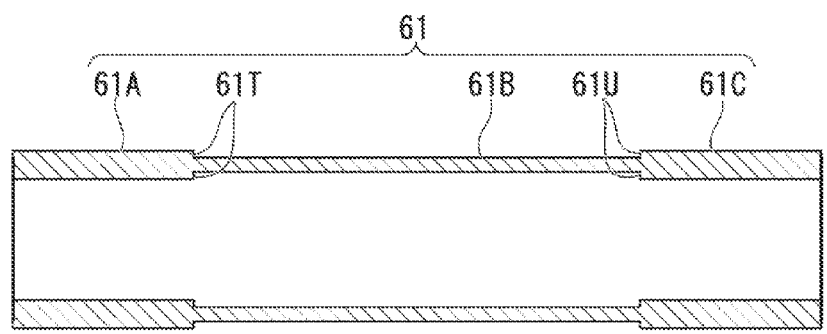
FIG. 13 is a cross-sectional view explaining a schematic constitution of a first modification example of the multilevel uneven thickness steel pipe used for manufacturing the lateral link 1A according to the second embodiment.

Next, the multilevel uneven thickness steel pipe according to a first modification example of the second embodiment will be described with reference to FIG. 13. FIG. 13 is a view showing a multilevel uneven thickness steel pipe 61 according to the first modification example of the second embodiment.

The differences of the multilevel uneven thickness steel pipe 61 from the multilevel uneven thickness steel pipe 60 are that the multilevel uneven thickness steel pipe 61 includes a first thick section 61A, a thin section 61B, and a second thick section 61C, the first thick section 61 A is connected with the thin section 61B through a multilevel section 61T protruding inwards and outwards in the radial direction from the thin section 61B, and the second thick section 61C is connected with the thin section 61B through a multilevel section 61U protruding inwards and outwards in the radial direction. The other aspects are the same as in the second embodiment, and thus a description thereof will be omitted here.

Figure 14:
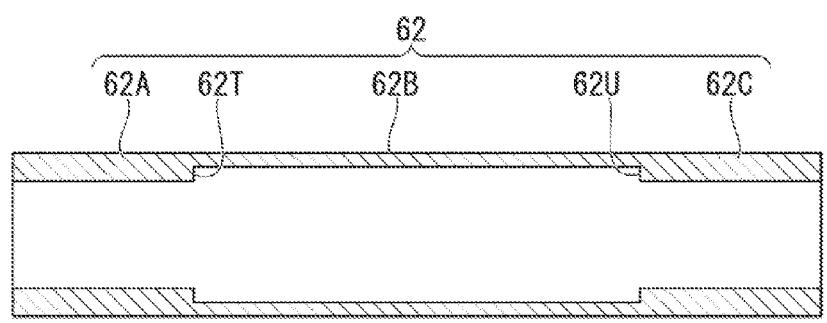
FIG. 14 is a cross-sectional view explaining a schematic constitution of a second modification example of the multilevel uneven thickness steel pipe used for manufacturing the lateral link 1A according to the second embodiment.

Next, the multilevel uneven thickness steel pipe according to a second modification example of the second embodiment will be described with reference to FIG. 14. FIG. 14 is a view showing a multilevel uneven thickness steel pipe 62 according to the second modification example of the second embodiment.

The differences of the multilevel uneven thickness steel pipe 62 from the multilevel uneven thickness steel pipe 60 are that the multilevel uneven thickness steel pipe 62 includes a first thick section 62A, a thin section 62B, and a second thick section 62C, the first thick section 62A is connected with the thin section 62B through a multilevel section 62T protruding inwards in the radial direction from the thin section 62B, and the second thick section 62C is connected with the thin section 62B through a multilevel section 62U protruding inwards in the radial direction. The other aspects are the same as in the second embodiment, and thus a description thereof will be omitted here.

Next, a third embodiment of the present invention will be described with reference to FIGS. 15 to 20.

Figure 15:
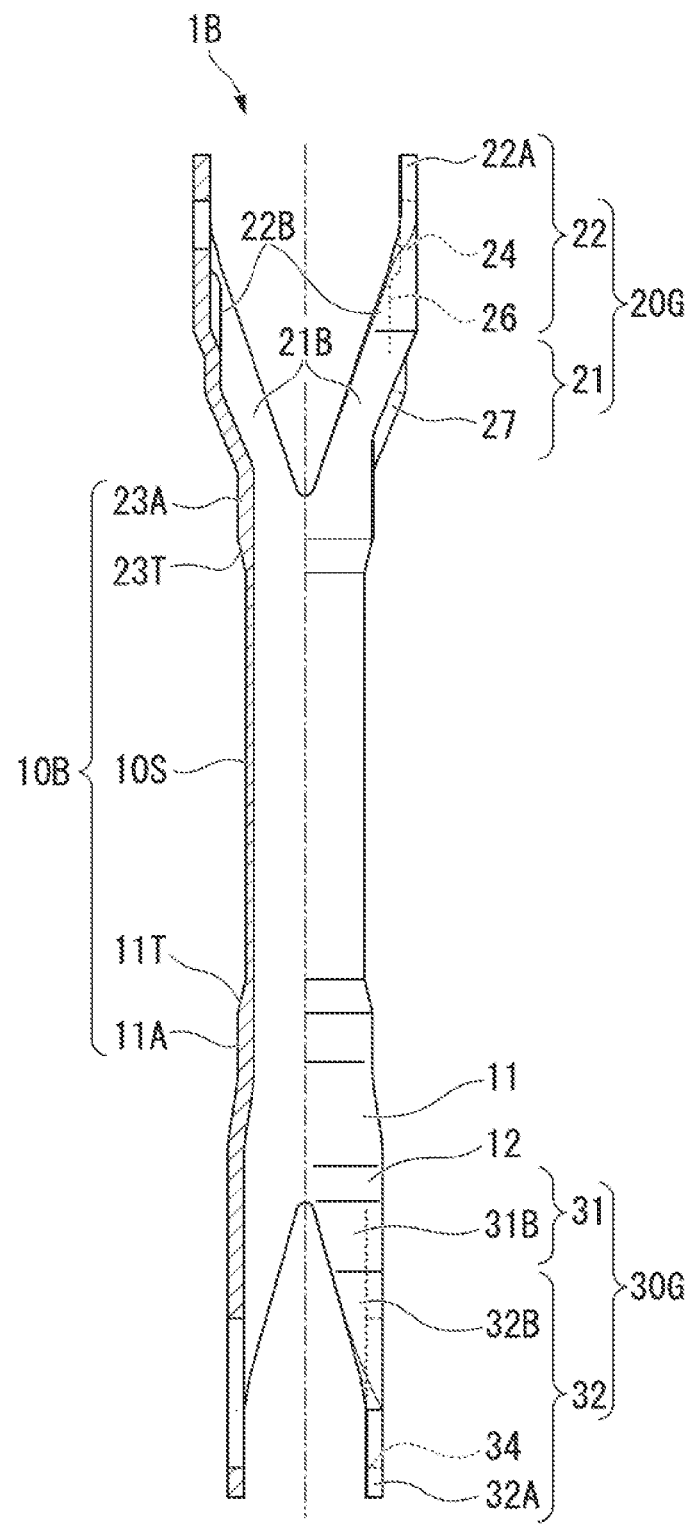
FIG. 15 is a partial cross-sectional view seen from the front explaining an overview of a lateral link 1B according to a third embodiment of the present invention.
Figure 16:
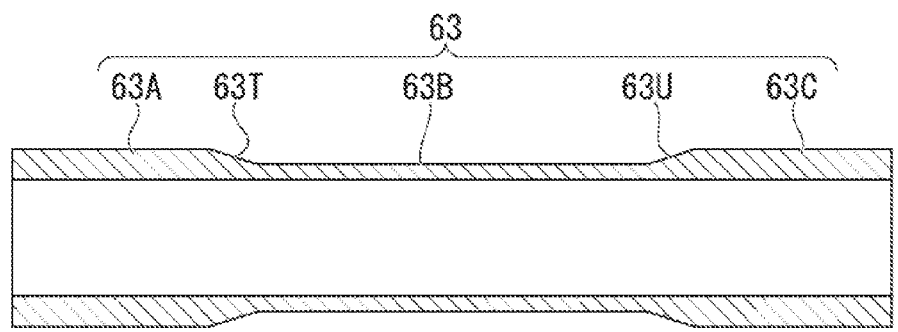
FIG. 16 is a cross-sectional view explaining a schematic constitution of a taper-attached uneven thickness steel pipe used for manufacturing tire lateral link 1B according to the third embodiment.

FIG. 15 is a partial cross-sectional view of a lateral link (coupling member) 1B according to the third embodiment seen from the front, and FIG. 16 is a cross-sectional view explaining a schematic constitution of a multilevel uneven thickness steel pipe 63 used for manufacturing the lateral link 1B.

The difference of the third embodiment from the first embodiment is that the lateral link 1B including a first fastening section 20G and a second fastening section 30G, which are set to be relatively thicker than a hollow rod section 10B, are manufactured using a taper-attached uneven thickness steel pipe (metal pipe) 63. The other aspects are the same as in the first embodiment, and thus description thereof will be omitted by using the same reference numbers.

The lateral link 1B includes the hollow rod section 10B, the first fastening section 20G connected with one end of the hollow rod section 10B, and the second fastening section 30G connected with the other end of the hollow rod section 10B as described in FIG. 15, and both end sides of the taper-attached uneven thickness steel pipe 63 are formed through plastic deformation using pressing.

In addition, in the lateral link 1B, the first fastening section 20G and the second fastening section 30G are Integrally formed with the hollow rod section 10B, and the first fastening section 20G and the second fastening section 30G are formed to be relatively thicker than the straight section 10S in the hollow rod section 10B.

As shown in FIG. 16, the multilevel uneven thickness steel pipe 63 used for manufacturing tire lateral link 1B includes, for example, a first thick section 63A, a thin section 63B, and a second thick section 63C, the first thick section 63A is connected with the thin section 63B through a taper section 63T protruding outwards in the radial direction from the thin section 63B, and the second thick section 63C is connected with the thin section 63B through a taper section 63U protruding outwards in the radial direction.

In the present embodiment, for example, the first thick section 63A and the second thick section 63C have the same thickness.

The hollow rod section 10B includes, for example, the straight section 10S formed in a cylindrical shape, a fastening section-side taper section 23T and a fastening section-side thick section 23A, which are formed on the first fastening section 20G side of the straight section 10S, and a holding section-side taper section 11T and a holding section-side thick section 11A, which are formed on the second fastening section 30G side.

The fastening section-side thick section 23A is formed in substantially the same thickness as the first fastening section 20G, and is connected with the straight section 10S through the fastening section-side taper section 23T protruding outwards from the straight section 10S which is formed to be relatively thin.

The holding section-side thick section 11A is connected with the straight section 10S through the holding section-side taper section 11T protruding outwards from the straight section 10S which is formed to be relatively thin, and is formed thicker than the straight section 10S.

The second fastening section 30G is expanded in diameter on the front end side from the expanded tube section 11. through plastic deformation, and is opened to be greater than the internal diameter of the hollow rod section 10B toward the front end side from the base end side, and therefore, similar to the first embodiment, the peripheral wall section is formed to be thinner than the holding section-side thick section 11A.

Whether the second fastening section 30G is set to be thicker than the straight section 10S can be arbitrarily set depending on the thickness of the thick section in the multilevel uneven thickness steel pipe 63.

Figure 17:
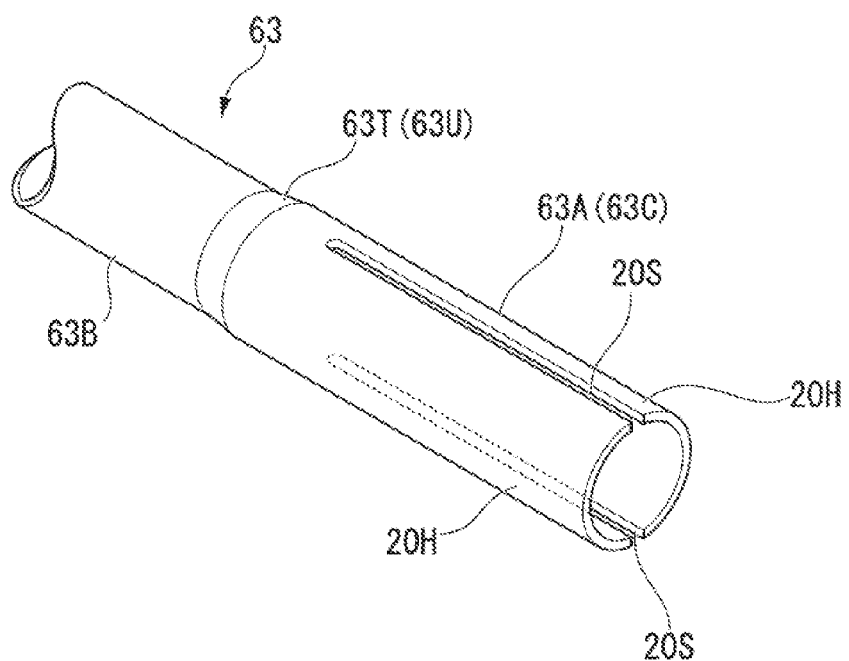
FIG. 17 is a perspective view showing a state in which slits are formed in the steel pipe when the first fastening section is formed in the step for manufacturing the lateral link 1B according to the third embodiment.
Figure 18:
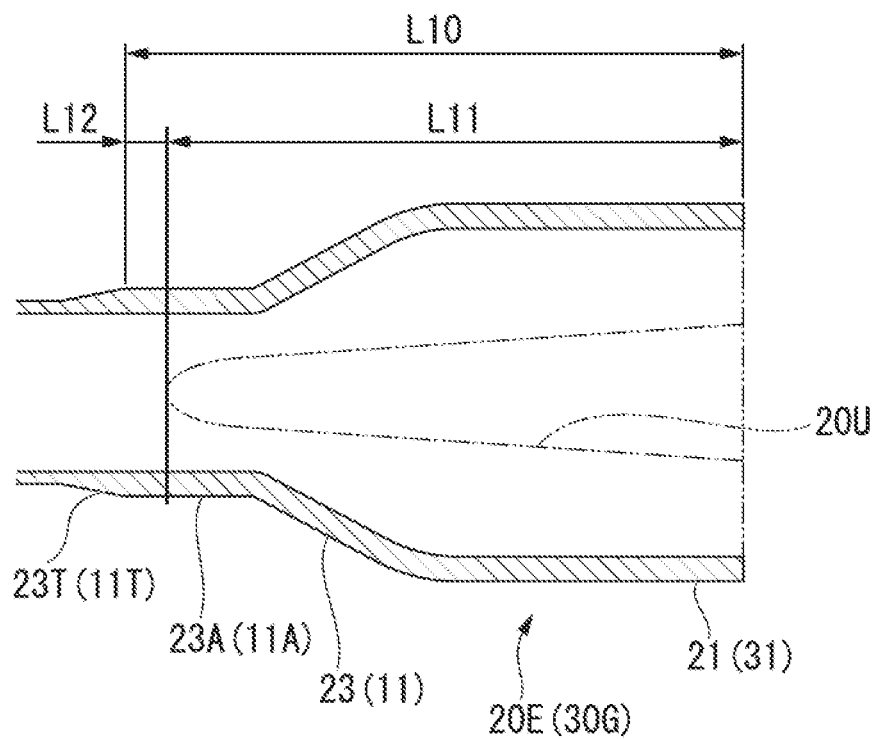
FIG. 18 is a cross-sectional view showing a state in which tire first fastening section is formed in the lateral link 1B according to the third embodiment by forming a pair of facing wall sections in the front end section.

FIG. 17 is a perspective view showing a state in which a pair effacing wall sections 20H and 20H is formed by forming two slits 20S and 20S in the multilevel uneven thickness steel pipe 63 when the first fastening section 20G is formed in the step for manufacturing the lateral link 10B. FIG. 18 is a cross-sectional view showing a state in which the first fastening section 20G is formed in the step tor manufacturing the lateral link 10B.

When the slits 20S are formed, for example, within the range of the thick sections 63A and 63C in the multilevel uneven thickness steel pipe 63 as shown in FIG. 17, the strength of the first fastening section 20G is easily and stably ensured, and the quality is easily managed, which are preferable. The slits 20S can be formed up to the taper sections 63T and 63U or a straight section 63B in the multilevel uneven thickness steel pipe 63. Furthermore, the stain-affected end section refers to a portion corresponding to the depth location of the slit 20U formed by widening the slit 20S shown in FIG. 6B. What has been described above shall similarly apply to the second fastening section 30G.

FIG. 18 is also a cross-sectional view showing the lateral link 10B in a state in which the first fastening section 20G is formed by forming a pair of the feeing wall sections 2011 in the front end section 22. The reference sign L10 indicates the length from the front end section of the front end section 22 to the fastening section-side taper section 23T, the reference sign L11 indicates the length from the front end section of the front end section 22 to the strain-affected end section, and the reference sign L12 indicates the length from the strain-affected location to the first fastening section-side taper section 23T.

Here, it is preferable to satisfy L1>0 since the strength of the first fastening section 20G is stably ensured. What has been described above shall similarly apply to the second fastening section 30G.

According to the lateral link 1B of the third embodiment, the thick sections 63A and 63B in the multilevel uneven thickness steel pipe 63 are applied to the first fastening section 20G and the second fastening section 30G formed through plastic deformation. Therefore, the first fastening section 20G and the second fastening section 30G, in which a greater strength is required, are formed to be thicker than the hollow rod section 10B, in which a relatively lower strength is required, and consequently, it is possible to efficiently reduce the weight of the lateral link 1B, and furthermore, reduce the manufacturing cost.

In addition, according to the lateral link 1B, the thickness changes from the straight section 10S to the first fastening section-side thick section 23A through the first fastening section-side taper section 23T, and the thickness changes from the straight section 10S to the holding section-side thick section 11A through the holding section-side taper section 11T, whereby the occurrence of stress concentration is suppressed in a case in which a load is applied, and therefore it is possible to stably ensure the strength.

Figure 19:
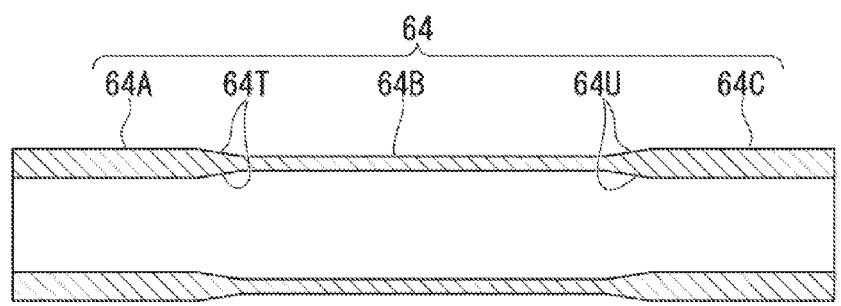
FIG. 19 is a cross-sectional view explaining a schematic constitution of a first modification example of the taper-attached uneven thickness steel pipe used for manufacturing the lateral link 1B according to the third embodiment.

Next, the multilevel uneven thickness steel pipe according to a first modification example of the third embodiment will be described with reference to FIG. 19. FIG. 19 is a view showing a multilevel uneven thickness steel pipe 64 according to the first modification example of the third embodiment.

The differences of the multilevel uneven thickness steel pipe 64 from the multilevel uneven thickness steel pipe 63 are that the multilevel uneven thickness steel pipe 64 includes a first thick section 64A, a thin section 64B, and a second thick, section 64C, the first thick section 64A is connected with the thin section 64B through a taper section 64T protruding inwards and outwards in the radial direction from the thin section 64B, and the second thick section 64C is connected with the thin section 64B through a multilevel section 64U protruding inwards and outwards in the radial direction.

Figure 20:
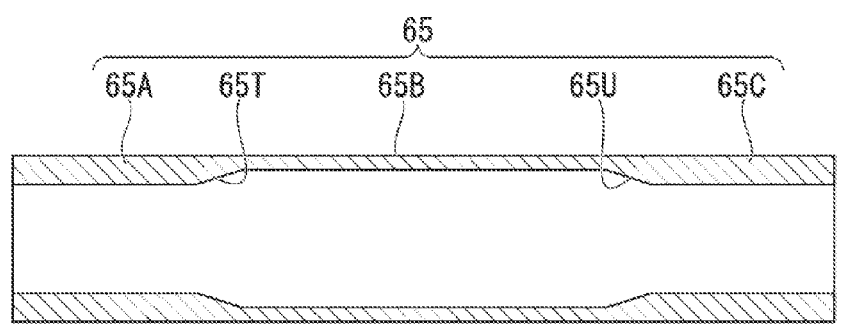
FIG. 20 is a cross-sectional view explaining a schematic constitution of a second modification example of the taper-attached uneven thickness steel pipe used for manufacturing the lateral link 1B according to the third embodiment.
Figure 21:
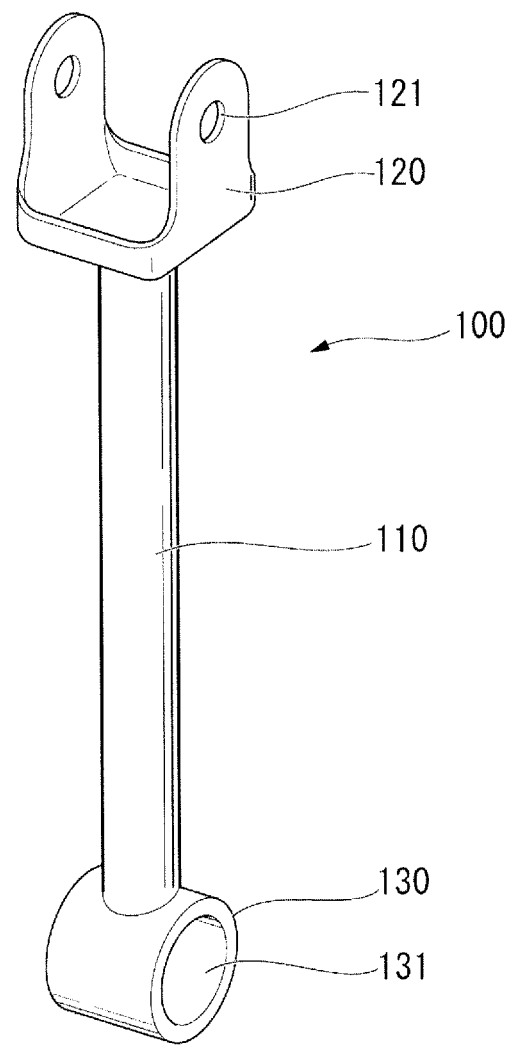
FIG. 21 is a view explaining a schematic constitution of a lateral link of the related art.

Next, the multilevel uneven thickness steel pipe according to a second modification example of the third embodiment will be described with reference to FIG. 20. FIG. 20 is a view showing a multilevel uneven thickness steel pipe 65 according to the second modification example of the third embodiment.

The differences of the multilevel uneven thickness steel pipe 65 from the multilevel uneven thickness steel pipe 63 are that the multilevel uneven thickness steel pipe 65 includes a first thick section 65 A, a thin section 65B, and a second thick section 65C, the first thick section 65A is connected with the thin section 65B through a taper section 65T protruding inwards in the radial direction from the thin section 63B, and the second thick section 65C is connected with the thin section 63B through a taper section 65U protruding inwards in the radial direction. The other aspects are the same as in the third embodiment, and thus a description thereof will be omitted here.

Meanwhile, the present invention is not limited to the above-described embodiments, and a variety of modifications are allowed within the scope of the purpose of the invention.

For example, the case in which the coupling member is the lateral link 1 has been described in the above-described embodiments; however, instead of the lateral link 1, the present invention may be applied to other coupling members for vehicles and coupling members constituting a construction structure or a mechanical structure.

In addition, in the above-described embodiments, the case in which, in the lateral link 1, one end section of the hollow rod section 10 is formed into the first fastening section 20, and the other end section is formed into the second fastening section 30 has been described; however, for example, whether the fastening sections are provided at both end sections or one end section of the hollow rod section 10, and which of the first fastening section 20 and the second fastening section 30 is provided can be arbitrarily set.

In addition, in the above-described embodiments, the case in which the attachment hole 24 is formed in the first fastening section 20 through piercing, and the attachment hole 34 is formed in the second fastening section 30 through burring has been described, but whether or not a hole is formed in the first fastening section 20 and the second fastening section 30, and what method is used to form the hole can be arbitrarily set.

In addition, in the above-described embodiments, the case in which the first fastening section 20 is formed to be separated wider than the hollow rod section 10 has been described, but the first fastening section 20 may be formed with substantially the same gap as the hollow rod section 10 therebetween.

In addition, in the above-described embodiments, the case in which, regarding the second fastening section 30, the front end sections 31 formed to be wider than the peripheral length of the steel pipe 10M by expanding the steel pipe 30M are separated with substantially the same gap as the hollow rod section 10 therebetween has been described, but a constitution in which the front end sections 31 formed to be wide are separated with a gap wider than the hollow rod section 10 therebetween may be employed.

In the above-described embodiments, the case in which the steel pipe constituting the hollow rod section 10 includes the peripheral wall section having a round cross-section orthogonal to the axial direction has been described, but it is needless to say that, for example, the cross-section orthogonal to the axial direction, in which a pair of racing wall sections can be provided by forming slits, may have a polygonal shape (not limited to a regular polygonal shape) such as a rectangular shape.

In the above-described embodiments, the case in which the first reinforcing bead 26 and the second reinforcing bead 27 are formed in the first fastening section 20 has been described, but whether or not the reinforcing bead is formed in the first fastening section 20, and, in a case in which the reinforcing bead is formed, the position, number, and shape of the reinforcing head can be arbitrarily set. In addition, whether or not the reinforcing bead is formed in the second fastening section 30 or the second fastening section separated wider than the hollow rod section 10, and, in a case in which the reinforcing bead is formed, the position, number, and shape of the reinforcing bead can also be arbitrarily set.

In addition, in the above-described embodiments, the case in which the first fastening sections 20E and 20G and the second fastening sections 30E and 30G are all formed to be the thick sections has been described, but any one of the first fastening sections 20E and 20G and the second fastening sections 30E and 30G may be formed to be the thick sections.

In addition, in the above-described embodiments, the case in which the thick sections 60A . . . 65A and 60C . . . 65C of the uneven thickness steel pipes 60 . . . 65 are applied to all the first fastening sections 20E and 20G and the second fastening sections 30E and 30G, and apart of the hollow rod sections 10A and 10B has been described, but the thin sections of the uneven thickness steel pipes 60 . . . 65 may be applied to a part of the first fastening sections 20E and 20G and the second fastening sections 30E and 30G.

In addition, in the above-described embodiments, the case in which the uneven thickness steel pipes 60 . . . 65 have the first thick sections 60A. . . 65A formed at one end, and have the first thick sections 60B . . . 65B formed at the other end has been described, but the thick section may be formed at any one of both ends.

In addition, in the above-described embodiments, the case in which the thin section 60B is connected with the thick section through the multilevel section or the taper section has been described, but the thin section and the thick section can he connected in an arbitrarily-set manner such as the multilevel section, the taper section, a smooth curve, or other well-known shapes.

In addition, in the above-described embodiments, the case in which the thick sections on both sides have the same thickness has been described, but. both thick sections may have different thicknesses. In addition, the thick section may have a uniform thickness, and the thickness of the thick section may vary in multiple levels or smoothly, and protrusions and recesses may be formed.

In addition, in the above-described embodiments, the case in which the lateral link 1 is formed of a steel pipe (including the uneven thickness steel pipe) has been described; however, for example, instead of the steel pipe, a pipe material made of other plastically deformabie materials such as magnesium (including alloys) and aluminum, (including alloys) may be used,

INDUSTRIAL APPLICABILITY

According to the coupling member of the present invention and the method for manufacturing the same, it is possible to reduce the weight and cost of the coupling member (the lateral link or the like) and improve the productivity of the coupling member, and thus the present invention is industrially applicable.

BRIEF DESCRIPTION OF THE REFERENCE SYMBOLS

1: LATERAL LINK (COUPLING MEMBER)
10: HOLLOW ROD SECTION
11: EXPANDED PIPE SECTION
12: STRAIGHT SECTION
20: FIRST FASTENING SECTION (FASTENING SECTION)
21: BASE END SECTION
21 A: BOTTOM WALL
21 B: SIDE WALL
22: FRONT END SECTION
22A: BOTTOM WALL
22B: SIDE WALL
24: ATTACHMENT HOLE
26: FIRST REINFORCING BEAD
27: SECOND REINFORCING BEAD
30: SECOND FASTENING SECTION (FASTENING SECTION)
31: BASE END SECTION
31A: BOTTOM WALL
31B: SIDE WALL
32: FRONT END SECTION
32A: BOTTOM WALL
32B: SIDE WALL
34: ATTACHMENT HOLE
35: SECOND REINFORCING BEAD
60, 61, 62: MULTILEVEL UNEVEN THICKNESS STEEL PIPE (UNEVEN THICKNESS METAL PIPE)
63, 64, 65: TAPER-ATTACHED UNEVEN THICKNESS STEEL PIPE (UNEVEN THICKNESS METAL PIPE)
60A, 61A, 62A, 63A, 64A, 65A: THICK SECTION
60C, 61C 62C, 63C, 64C, 65C: THICK SECTION

The invention claimed is:
1. A coupling structure comprising:
a hollow rod section of a metal pipe; and
fastening sections connected with end sections of the hollow rod section,
wherein each of the fastening sections includes:
a pair of base end sections which are each connected with a peripheral wall section forming a closed cross-section at the end section of the hollow rod section, and are separated from each other, and
a pair of front end sections each including (i) a bottom wall including a flat surface connected to the pair of the base end sections, and (ii) a pair of side walls curving from at least widthwise end sections of the bottom wall on a base end section side of one front end section of the pair of front end sections, toward the other front end section of the pair of front end sections, and a maximum width of each of the front end sections is greater than ½ of a length of an outer periphery in the end section of the hollow rod section.

2. The coupling structure according to claim 1, wherein of the fastening sections is formed by plastically deforming a pair of wall sections formed by providing two slits extending in an axial direction of the metal pipe at the end sections of the metal pipe.

3. The coupling structure according to claim 1, wherein, in the pair of the base end sections, mutual separation distance on a front end section side is greater than mutual separation distance on a hollow rod section side.

4. The coupling structure according to claim 1, wherein the pair of the base end sections includes an outward reinforcing bead protruding outwards.

5. The coupling structure according to claim 1, wherein the pair of the front end sections includes an inward reinforcing bead protruding inwards.

6. The coupling structure according to claim 1, wherein the pair of the base end sections includes an outward reinforcing bead protruding outwards, and the pair of the front end sections includes an inward reinforcing bead protruding inwards.

7. The coupling structure according to claim 1, wherein a thick section of an uneven thickness metal pipe is applied to the fastening section.

8. The coupling structure according to claim 1, wherein the metal pipe is a metal pipe having a tensile strength of 590 MPa or more.

9. The coupling structure according to claim 1, wherein the metal pipe is a steel pipe.

10. A coupling member comprising the coupling structure according to claim 1.

* * * * *